US 6,751,626 B2

(12) United States Patent
Brown et al.

(10) Patent No.: US 6,751,626 B2
(45) Date of Patent: Jun. 15, 2004

(54) METHOD, SYSTEM, AND PROGRAM FOR MINING DATA IN A PERSONAL INFORMATION MANAGER DATABASE

(75) Inventors: Michael Wayne Brown, Georgetown, TX (US); Rabindranath Dutta, Austin, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 09/848,176

(22) Filed: May 3, 2001

(65) Prior Publication Data
US 2002/0171673 A1 Nov. 21, 2002

(51) Int. Cl.$^7$ ................................ G06F 17/30
(52) U.S. Cl. ........................ 707/101; 707/3; 707/6; 707/100; 707/10
(58) Field of Search ............... 707/3, 6, 100, 707/101, 10; 705/8, 9; 342/357.01, 357.06

(56) References Cited

U.S. PATENT DOCUMENTS

| | | | |
|---|---|---|---|
| 5,124,912 A | 6/1992 | Hotaling et al. ............ 364/401 |
| 5,416,473 A | 5/1995 | Dulaney, III ........... 340/825.44 |
| 5,428,784 A | 6/1995 | Cahill, Jr. ................... 709/206 |
| 5,664,063 A | 9/1997 | Johnson et al. .............. 358/1.1 |
| 5,664,175 A | 9/1997 | Jackson et al. ................. 707/7 |
| 5,774,873 A | 6/1998 | Berent et al. ................. 705/26 |
| 5,790,974 A | 8/1998 | Tognazzini ................. 701/204 |
| 5,832,489 A | 11/1998 | Kucala ........................ 707/110 |
| 5,835,896 A | 11/1998 | Fisher et al. .................. 705/37 |
| 5,890,138 A | 3/1999 | Godin et al. .................. 705/26 |
| 5,918,158 A | 6/1999 | LaPorta et al. ............. 455/31.3 |
| 6,047,260 A | 4/2000 | Levinson ........................ 705/9 |
| 6,085,166 A | 7/2000 | Beckhardt et al. .............. 705/9 |
| 6,101,480 A | 8/2000 | Conmy et al. .................. 705/9 |
| 6,154,172 A | 11/2000 | Piccionelli et al. ....... 342/357.1 |
| 6,154,727 A * | 11/2000 | Karp et al. ..................... 705/3 |
| 6,317,718 B1 * | 11/2001 | Fano .............................. 705/1 |
| 6,411,891 B1 * | 6/2002 | Jones ......................... 701/201 |
| 6,569,094 B2 * | 5/2003 | Suzuki et al. ................ 600/300 |
| 6,574,630 B1 * | 6/2003 | Augustine et al. ............ 707/10 |
| 2001/0020204 A1 * | 9/2001 | Runyon et al. ............... 701/35 |
| 2001/0052873 A1 * | 12/2001 | Rezai ..................... 342/357.01 |
| 2002/0083025 A1 * | 6/2002 | Robarts et al. ................ 706/12 |
| 2002/0175211 A1 * | 11/2002 | Dominquez et al. ........ 235/492 |

FOREIGN PATENT DOCUMENTS

| | | | |
|---|---|---|---|
| EP | 0495622 | 1/1992 | ......... G06F/15/401 |
| EP | 0637807 | 7/1994 | ........... G06F/17/60 |
| EP | 0834840 | 9/1997 | ............. G07C/1/00 |
| EP | 1039397 | 9/2000 | ........... G06F/17/30 |
| WO | 0029979 | 5/2000 | ........... G06F/17/30 |

OTHER PUBLICATIONS

U.S. Application Ser. No. 09/848,166, filed on May 3, 2001, entitled "Method System and Program for Providing User Location Information with a Personal Information Management Program," by MW Brown; R Dutta and MA Paolini.

(List continued on next page.)

*Primary Examiner*—Jean R. Homere
*Assistant Examiner*—Khanh Pham
(74) *Attorney, Agent, or Firm*—David W. Victor; Konrad Raynes & Victor LLP

(57) ABSTRACT

Provided is a method, system, and program for analyzing data within a personal information management program. Position records are provided in a database for at least one user. Each position record includes a time period value and event information indicating an event that occurred with respect to the user during the time period. The time period value and event information in each position record is based on time information and position coordinates generated by a wireless device associated with the user that indicate a location of the wireless device for time periods. The database is queried to determine position records for one user that satisfy at least one search criteria. Information is generated characterizing data in the determined position records.

54 Claims, 14 Drawing Sheets

OTHER PUBLICATIONS

Patent Cooperation Treaty (PCT) International Search Report, for International Application No. PCT/GB 02/02051, Search completed on May 9, 2003.

U.S. application Ser. No. 09/848,173, filed on May 3, 2001, entitled "Method, System and Program for Providing User Loacation Information for a Personal Information Management System from Transmitting Devices," by M. Paolini, et al.

Mueller, Erik T., "A Calendar with Common Sense", © 2000 ACM, pp. 198–201.

Schwartz, Ephraim, "Cellular Phone Giants to Integrate Sirf's GPS Technology", Aug. 10, 1998 [online], Retrieved from the Internet <URL: www.infoworld.com./cgi–bin/displayStory.pl?980810.ehe911.htm>.

"allNetDevices:—The Wireless Internet: Applications, Technology and Market Strategies", Jan. 10, 2001, pp. 1–4 [online]. Retrieved from the Internet <URL: www.allnetdevices.com/icom_cgi/print/print.cgi?url=http://www.allnetdevices.com/wireless/opinions/2001. . . >.

"allNetDevices:—Java 2 Micro Edition and the Mobile Information Device Profile", Feb. 16, 2001, pp. 1–7 [online]. Retrieved from the internet <URL: www.allnetdevices.com/icom_cgi/print/print.cgi?url=http://www.allnetdevices.com/developer/tutorials/2001. . . >.

Software Patent Institute Database of Software Technologies, Record Display, Record 4, Serial number TDB1192.0038. Retrieved from the Internet <URL: http://m.spi.org/cgi–bin/newqry?ISA=Hit . . .000&rec=4&submit=seeit&csum=17256401361>.

Software Patent Institute Database of Software Technologies, Record Display, Record 6, Serial number TDB1192.0045. Retrieved from the Internet <URL: http://m.spi.org/cgi–bin/newqry?ISA=Hit . . . 000&rec=4&submit=seeit&csum=17950330939>.

"allNetDevices:—Wearable Transmeta Device Planned", Nov. 14, 2000 [online]. Retrieved from the Internet <URL: www.allnetdevices.com/icom_cgi/print/print.cgi?url=http://www.allnetdevices.com/wireless/news/2001. . . >.

"allNetDevices:—Any Content, Any Device, Anyplace", Feb. 16, 2000 [online]. Retrieved from the Internet <URL: www.allnetdevices.com/icom_cgi/print/print.cgi?url=http://www.allnetdevices.com/wireless/news/2001. . . >.

Patent Cooperation Treaty (PCT) International Search Report, Jan. 29, 2003, for International Application No. PCT/GB02/02020.

Beadle, H.W., et al. "*Using Location and Environment Awareness in Mobile Communications.*" International Conference on Information, Communications and Signal Processing. ICICS. Singapore Sep. 9–12, 1997, pp. 1781–1785. New York, NY, USA, IEEE.

Manandhar, Sanjay. "*Activity Server: You Can Run but You Can't Hide.*" Proceedings of the Summer Usenix Conference Proceedings, pp. 299–311, Jun. 10–14, 1991, Nashville, TN, US (1991) Berkeley, CA, U.S.

Want, R. et al., "*The Active Badge Location System.*" ACM Transactions on Information Systems 10 (1992), pp. 91–102, Jan., No. 1, New York, U.S.

Hancock, Bill. "*Wireless Big Brother.*" Computers and Security. International journal Devoted to the Study of Technical and Financial Aspects of Computer Security, Elsevier Science Publishers, vol. 19, No. 8, Dec. 1, 2000, pp. 667–668. Amsterdam, NL.

Rhodes, Bradley J. "*The Wearable Remembrance Agent: a System for Augmented Memory.*" Wearable Computes, 1997. Digest of Papers. First International Symposium on Cambridge, MA, USA, pp. 123–128.

* cited by examiner

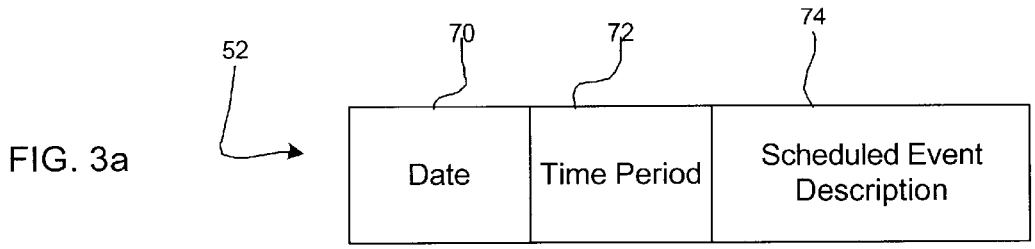
FIG. 3a  Scheduled Event Record
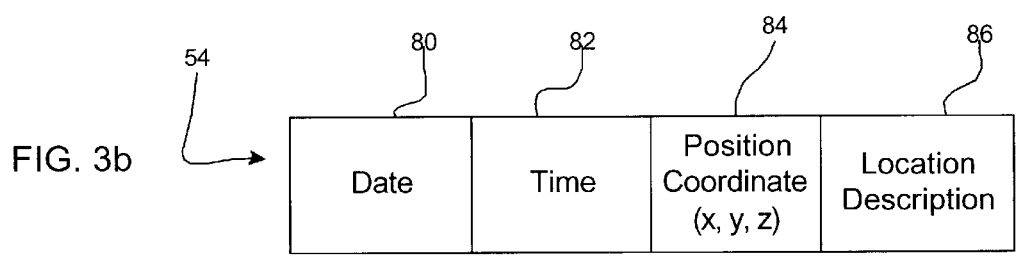
FIG. 3b  Measured Position Record
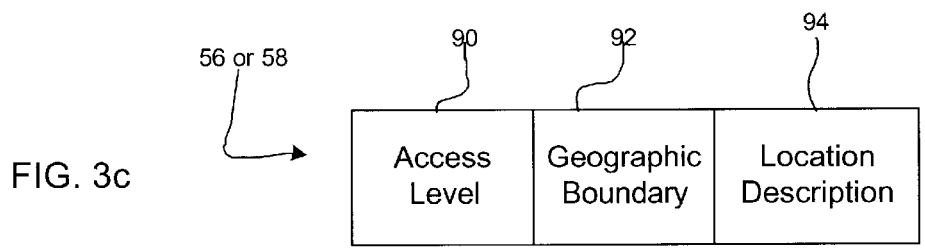
FIG. 3c  Location Record
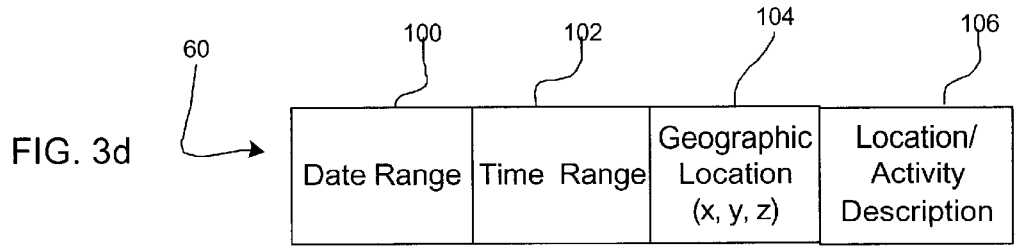
FIG. 3d  Filtered Position Record

FIG. 8

| Calendar | February 5, 2001 | | |
|---|---|---|---|
| Monday, February 5th | 400 | 402 | |
| Time | Scheduled Event | Actual Activity | |
| 8:00 AM | Arrive at Work | At Home | |
| 9:00 | Work at desk | In office | |
| 10:00 | | | |
| 11:00 | | | |
| 12:00 | Lunch at Dennys | In office | |
| 1:00 | Meeting w/ office team | In meeting room | |
| 2:00 | | In office | |
| 3:00 | | In office | |
| 4:00 | | In office | |
| 5:00 | Family Dinner | In office | |

406

April 2001
S M T W T F S
1 2 3 4 5 6 7
8 9 10 11 12 13 14
15 16 17 18 19 20 21
22 23 24 25 26 27 28
29 30

March 2001
S M T W T F S
1 2 3 4 5 6 7
8 9 10 11 12 13 14
15 16 17 18 19 20 21
22 23 24 25 26 27 28
29 30 29 30 31

METHOD, SYSTEM, AND PROGRAM FOR MINING DATA IN A PERSONAL INFORMATION MANAGER DATABASE

CROSS-REFERENCE TO RELATED APPLICATIONS

This application is related to the following co-pending and commonly-assigned patent applications filed on the same date herewith, and which are incorporated herein by reference in their entirety:

"Method, System, and Program for Providing User Location Information with a Personal Information Management Program", having U.S. application Ser. No. 09/848,166; and "Method, System, and Program for Providing User Location Information for a Personal Information Management System from Transmitting Devices", having U.S. application Ser. No. 09/848,173.

BACKGROUND OF THE INVENTION

1. Field of the Invention

The present invention relates to a method, system, and program for mining data in a personal information manager database.

2. Description of the Related Art

Organizations and individuals use scheduling and calendaring software programs to schedule their daily activities. At some point, a person may want to know the extent to which they have met their scheduled goals. For instance, an individual may want to know how often they were late or early for business meetings. A company may want to know how much time individuals in fact spent at scheduled activities or at designated work locations.

In the current art, to make such determinations as to whether an individual adhered to the scheduled events, the organization would have to question the individual to gather information on actual activity. Such information of actual activity may be difficult to accurately gather unless a person keeps a written diary of their activities on a daily basis. Otherwise, most people if questioned on their actual activity a few days following the activity will be unable to relate accurate information. Given these constraints in gathering actual activity information, the ability to accurately compare and analyze actual versus scheduled activity is not a capability that has been developed and offered as of date.

For these reasons, there is a need in the art for technology to allow individuals and organizations to accurately determine the extent to which actual activity of a person coincides with scheduled events.

SUMMARY OF THE PREFERRED EMBODIMENTS

Provided is a method, system, and program for analyzing data within a personal information management program. Position records are provided in a database for at least one user. Each position record includes a time period value and event information indicating an event that occurred with respect to the user during the time period. The time period value and event information in each position record is based on time information and position coordinates generated by a wireless device associated with the user that indicate a location of the wireless device for time periods. The database is queried to determine position records for one user that satisfy at least one search criteria. Information is generated characterizing data in the determined position records.

In further implementations, the search criteria includes specified event information, wherein the query determines all position records having event information matching the specified event information. For all the determined position records that include event information matching the user specified event information, the time period values are aggregated to determine a total time, wherein the generated information indicates the total time associated with the event identified by the specified event information.

Still further, the event information may identify a location and the search criteria may include one specified location, wherein the total time indicates a time period the user of the wireless device was at the identified location.

Additionally, the event information may identify an activity and the search criteria may include one specified activity, wherein the time value indicates the time period during which the user of the wireless device was engaged in the identified activity.

In still further implementations, the database includes scheduled event records for at least one user, wherein each scheduled event record includes a time period value and event information identifying a scheduled event at the time period value. The database is queried to determine all scheduled event records for the one user that satisfy the at least one search criteria that was used to query the position records for the user. In such case, the generated information includes a comparison of the determined scheduled event records and the determined position records.

In further implementations, the database is queried to determine position records for one user that satisfy at least one search criteria including specified event information. A determination is then made of an aggregate amount of actual from the time periods included in the determined position records for the event identified by the specified event information and of an aggregate amount of scheduled time from the time periods included in the determined scheduled event records for the event identified by the specified event information. information is displayed indicating the aggregate amount of scheduled time and the aggregate amount of actual user time for the event identified by the user specified event information.

The described implementations provide a technique for data mining information in a database that includes records indicating events and time periods of a user that are based on positioned coordinates generated by a wireless device. The described implementations provide a technique to gather and analyze information on the whereabouts of one or more users having records in the database. The database may further include scheduled events for the user. In such case, the described implementations provide techniques for comparing data concerning scheduled events and actual realization of the scheduled events for specified time periods.

The described implementations, thus, provide tools for analyzing and tracking user activity and presence at particular locations over periods of time.

BRIEF DESCRIPTION OF THE DRAWINGS

Referring now to the drawings in which like reference numbers represents corresponding parts throughout:

FIGS. 3a, b, c, d illustrate data structures used in accordance with implementations of the present invention;

FIGS. 8, 9a, and 9b illustrate examples of a display of user calendar and generated location information in accordance with implementations of the present invention;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

The described implementations provide technology to accurately gather information on a person's events for time periods, such as activities and/or locations, and maintain such information in a database. The implementations described with respect to FIGS. 1 through 9b describe an implementation of technology to gather information on a person's scheduled and actual events, such as activities and locations, and store such information in a manner that is readily accessible for data mining operations that compare and analyze scheduled versus actual activity.

Figure 1:
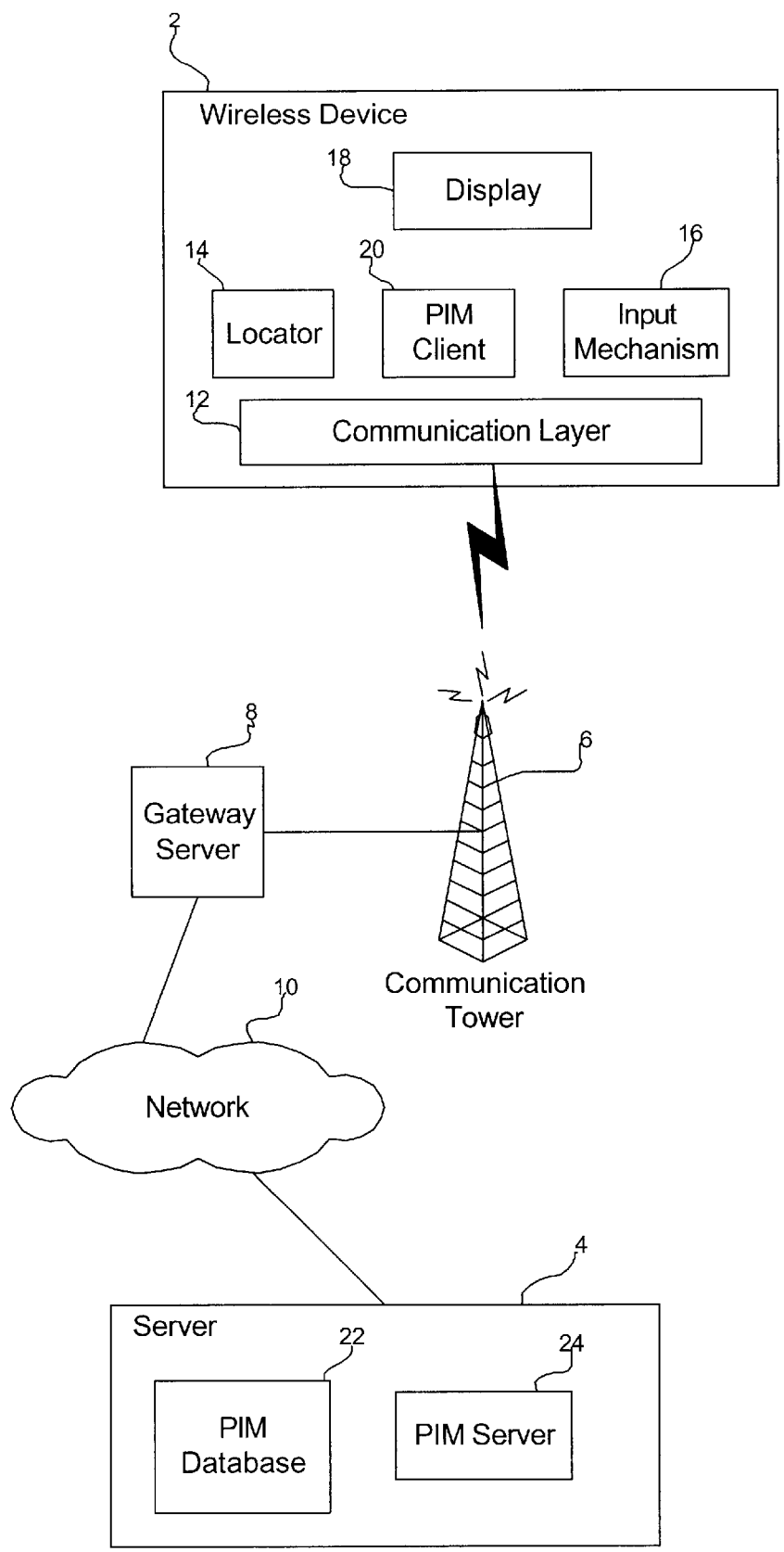
FIG. 1 illustrates a telecommunication environment in which aspects of the invention are implemented.

FIG. 1 illustrates a wireless computing environment in which embodiments of the invention are implemented. A wireless device 2, such as a telephony device, e.g., cellular phone, personal digital assistant (PDA), hand held computer, palm computer, etc., communicates with a server 4 via a communication tower 6, gateway server 8, and network 10. The server 4 may comprise one or more server class machines known in the art. The wireless device 2 includes a communication layer 12 which converts digital data into a signal that is transmitted to the communication tower 6 in a manner known in the art. The gateway server 8 converts the signals back into digital data to transmit via network 10 to the server 4. The network 10 may comprise any collection of devices, routers, etc. used to transmit data to a centralized server 4 providing data management for the wireless device 2 operations. The communication tower 6 and communication layer 12 may implement any known wireless transmission technology known in the art, such as 3G, Code-Division Multiple Access (CDMA), Global System for Mobile Communications (GSM), satellite, Bluetooth, etc.**

The wireless device 2 further includes locator technology 14 that provides a current position coordinate of the wireless device 2 in three dimensional space (x, y, z) on the surface of the earth and the time the position coordinate was generated. The locator 14 may comprise a global position satellite (GPS) receiver that is capable of calculating a current position based upon signals sent from satellites in a manner known in the art. Alternatively, the location of the wireless device 2 can be estimated externally from the wireless device by measuring the transmissions from the wireless device 2 using any known location positioning technology in a manner known in the art, such as Enhanced Observed Time Differential E-OTD), Time Of Arrival (TOA), the CellPoint positioning system, the Ericsson Mobile Positioning System, etc.** In fact the U.S. Federal Communication Commission (FCC) mandated that cellular phone manufacturers incorporate technology to allow the location of the wireless device 2 to be determined. Any reference to the locator 14 refers to the locator technology used within the wireless device 2 that enables a position determination. For instance, if the locator 14 comprises a GPS receiver, then the locator 14 itself may determine the actual position coordinate. Alternatively, the locator 14 may provide information to an external component to enable the external component to determine the position coordinate of the wireless device 2.

**Bluetooth is a trademark of Telefonaktiebolaget LM Ericsson.

The wireless device 2 further includes an input mechanism 16 for entering any type of data, including text, voice data, audio, images, movies, etc. The input mechanism 16 may include any known data input system known in the art, including a keyboard embedded in the device 2 with depressable keys, a touch sensitive displayed keyboard, a microphone for providing audio input, voice recognition software, still image camera, video recorder, pen-stylus text input system including handwriting recognition software, etc. Data entered by the user through the input mechanism 16 or downloaded from the server 4 can be rendered in display 18, which may comprise any electronic display device known in the art. A Personal Information Manager (PIM) client 20 gathers and presents PIM information, such as calendering and scheduling information, in accordance with the described implementations. The term "PIM" as used herein refers to a program designed to allow users to organize random bits of information in a useful format. The PIM program may enable calendar or scheduler operations. A calendar program enables one or more users to record and organize events and appointments. A scheduler program enables a group of colleagues to schedule meetings and other appointments, and share schedule and calendar information. Further, the PIM may be intended for use by a single individual for personal information or for use by a company or organization to provide information related to that persons involvement with the company or organization. The use of the term PIM or PIM program herein refers to any program that includes some or all of the above described calendar or scheduler functions, or any other functions those skilled in the art associate with PIMs.

The server 4 includes a PIM database 22 maintaining user PIM information and a PIM server 24 for gathering and filtering data from wireless devices 2 for the users of the system. The PIM database 22 may be implemented using any database technology known in the art, e.g., relational database, object oriented database, etc. Although FIG. 1 only shows one wireless devices 2, the server 4 and PIM database 22 may maintain data for multiple wireless devices 2 and users.

In the described implementations, the PIM client 20 gathers position coordinates for the PIM server 24. The PIM server 24 then uses the position coordinates to supplement the user calendar records with information on what the user actually did for time periods within a day. The user could then view this enhanced calender including listings of scheduled appointments as well as information describing the actual location and activities of the user and descriptions thereof The term "location" and "geographic location" as used herein refer to any location that may be mapped and ascertained. Such location or geographic location may be any location on the surface of the earth or the earth's atmosphere, or outer space, that can be expressed as a position coordinate in space. The term "location" or "geographic location" may refer to a specific position coordinate in space, e.g., an X, Y, Z coordinate, or a boundary or area of coordinates. Additionally, the location may be expressed as a vector. The term "position coordinate" as used herein refers to any of a set of numbers used in specifying the location of a point in space, or any one of a set of variables used in specifying the state or motion of an entity, such as a wireless unit or person, associated with the position coordinate.

The PIM server 24 includes the program logic that responds to data requests from PIM clients 20, accesses the PIM database 22 to perform database operations, and performs other data management operations related to managing the PIM database 22. The PIM server 24 may include a database management system (DBMS) known in the art or include an interface to access a DBMS program in a manner known in the art to perform operations with respect to the PIM database 22. The PIM server 24 may implement any database programming techniques for performing operations in the PIM database 22. For instance, the PIM server 24 may implement separate application programs for performing database operations or implement database stored procedures to perform database operations. The PIM client 20 includes those program components that gather coordinate and location information as described herein, communicates with the PIM server 24, and renders calendaring information at the wireless device 2.

Figure 2:
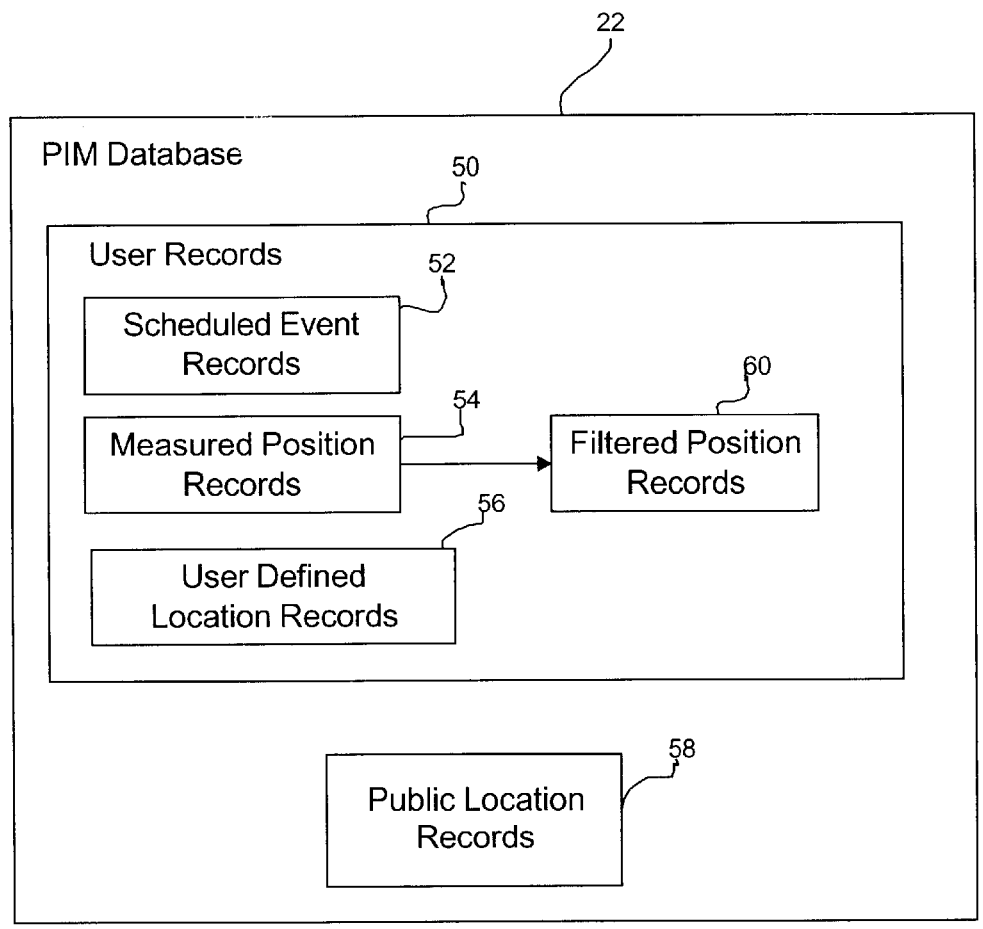
FIG. 2 illustrates components of a PIM database in accordance with implementations of the present invention.

FIG. 2 illustrates the data components of the PIM database 22 maintained by the server 4. The PIM database 22 includes a plurality of user records 50 for each user of a wireless device 2 participating in the wireless computing environment described herein. Each user record 50 includes one or more user scheduled event records 52, measured position records 54, and location records 56 and 58. From the measured position records 54, the PIM server 24 generates filtered position records 60 that provide information on user geographic location and activity for time periods, such as information for a period of fifteen minutes, twenty minutes, one hour, etc.

FIG. 3a illustrates fields in a user scheduled event record 52, including a date 70, time period 72 indicating a time range of the event, and a scheduled event description 74 providing information on the nature of the scheduled event. Through the client PIM 20 software, a user could use the input mechanism 16 to schedule a calendar event and create a scheduled event record 52. Additionally, the user could enter scheduled events from a desktop computer (not shown) that communicates with the server 4 via a network such as the Internet. The scheduled events may be shown in a calendar rendered on the display 18. Additionally, the scheduled events may be shown in a calendar rendered on another computer capable of accessing the server user records 50 in the server 4, such as a desktop computer communicating with the server 4 over the Internet.

FIG. 3b illustrates fields in a measured positioned record 54 for a user, including a date 80 and time 82 the position was measured, a position coordinate 84 expressed as a unique three dimensional x, y, z geographic coordinate on the surface of the earth and a location description 86 providing descriptive information on the location. In the described implementations, the PIM client 20 periodically generates a measured position record 54 by obtaining the measured position coordinate (x, y, z) and the current time from the locator 14 (which may, in certain implementation interact with external components to provide the location and position coordinate). The location description 86 may be obtained locally at the wireless device 2 or determined subsequently by the server 4 as described in the following implementations.

FIG. 3c illustrates the fields maintained in the user defined 56 and public 58 location records. An access level field 90 indicates which users can be allowed to use the location record 56 or 58 to determine information about a location. The public location record 58 has public level access such that the PIM server 24 can consider a public location record 58 for any user in the PIM database 22. A user location record 56 can only be considered for the particular user that defined the location record 58 and any other authorized users in the system, as indicated by the access level 90. A geographic boundary field 92 defines a boundary of a defined region in three dimensional space. A location description field 94 provides a description of the location, which may include text images, sound, movies, etc. A company maintaining the server 4, such as a telecommunication service provider, can use satellite maps and other information to determine the geographic boundaries in three dimensional space of various buildings and businesses. Business could register their geographic boundaries. Public location records 58 may then be generated for each of these determined geographic boundaries and include a description of the location within the geographic boundary.

The user specified location records 56 are generated by the user to provide information to include with the user's calendar. For instance, the user may obtain from a third party, such as a mapping company or organization, the geographic boundaries of an office or building and provide geographic boundary and location description information to the server 4 to include in a user location record 56. In another implementation, the user can activate a geographic boundary definition mode on the wireless device 2 to record position coordinates of a geographic boundary using the locator 14. In this geographic boundary definition mode, the user may walk or otherwise travel around a geographic area While moving through the geographic area, the wireless device 2 would determine the x, y, z position coordinates at frequent intervals using the locator 14. The PIM client 20 or PIM server 24 can then use the determined position coordinates to determine a geographic boundary bounding all of the coordinates generated in the geographic boundary definition mode. This determined geographic boundary would then be included in the geographic boundary field 92 of the eventual user defined location record 56 stored in the user records 50 in the database 22. The user may further use the input mechanism 16 to enter information to include in the location description field 94 and the access level 90. The user access level 90 may specify that the user location record 68 be accessible to the user and other specified users, thereby limiting access of the location record 56 to a user defined group.

FIG. 3d illustrates a filtered position record 60 generated from a range of consecutive position records 54 having a same location description 86. The date range 100 and time range 102 for the generated filtered position record 60 would comprise the first and last dates 80 and times 82 of the consecutive position records 64 having the same location description 86. In 1 this way, a single filtered position record 60 represents the data in multiple consecutive position records 54 having a same location description 106. Alternatively, a filtered position record 60 can consolidate multiple position records 54 that have position coordinates 84 within a predetermined proximity, without consideration of the location description 86. A geographic location field 104 indicates the common geographic location of the position records 60 having the same location description 86, which could include the geographic boundary from a location record 56 or 58 if the location description 86 of the consolidated position records 60 was determined from a location record 56 or 58.

Additionally, if algorithms in the PIM server 24 determine that a range of measured position records 54 define an activity, e.g., driving, walking, flying in an airplane, etc., then a filtered position record 60 would be generated for those position records 54 defining the activity. The date range 100 and time range 102 for the generated filtered position record 60 would comprise the first and last date 80 and time 82 of the consecutive position records 64 defining an activity and the location/activity description 106 field for this filtered position record 60 would include a description of the determined activity.

Figure 4:
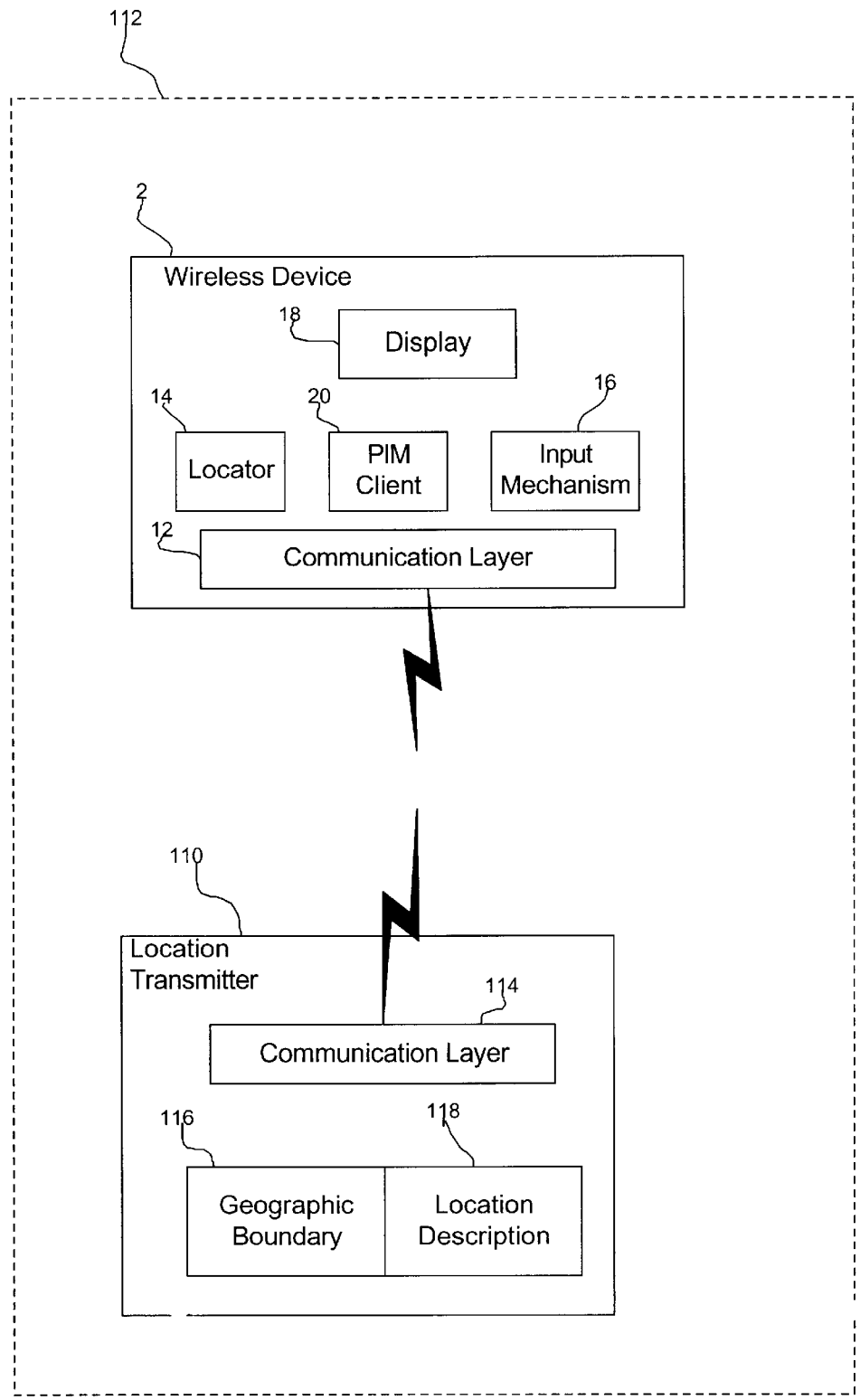
FIG. 4 illustrates further details of the telecommunication environment in which aspects of the invention are implemented.

FIG. 4 illustrates an additional implementation of the telecommunication environment for obtaining geographic boundary information. A location transmitter 110 is maintained in a geographic location or boundary 112, such as an office, building, designated region, etc., and includes a communication layer 114 to transmit data throughout the geographic location 112. For larger geographic locations, multiple location transmitters 110 may be deployed to transmit throughout the entire geographic location 112. The location transmitter 110 maintains a geographical boundary 116, defining a region of x, y, z coordinates, and a location description 118 providing descriptive information on the geographic boundary 112. The local transmitter 110 is capable of transmitting the geographic boundary 116 and location description 118 through the communication layer 114 to any receiving device within the geographic boundary 102. For instance, the communication layers 12 and 114 of the wireless device 2 and location transmitter 110, respectively, may implement Bluetooth technology. In such Bluetooth implementations, the location transmitter 110 may continually transmit packets containing an Inquiry Access Code (IAC) to establish communication with any wireless devices 2 within the geographic boundary 112. The wireless device 2 may then respond to establish a connection with the local transmitter 110. Upon establishing the connection, the local transmitter 110 may then transmit the geographic boundary 116 and location description 118 through communication layer 114 to the communication layer 12 of the wireless device 2. Further details of Bluetooth communication technology are described in the publication "Bluetooth(TM): Connect Without Cables" by Jennifer Bray and Charles F. Sturman (Copyright 2001, Prentice Hall), which publication is incorporated herein by reference in its entirety. In alternative implementations, the communication layers 12 and 114 may utilize wireless communication protocols other than Bluetooth known in the art to perform the communication operations described herein, such as the wireless LAN architecture standard proposed in IEEE 802.11.

Figure 5:
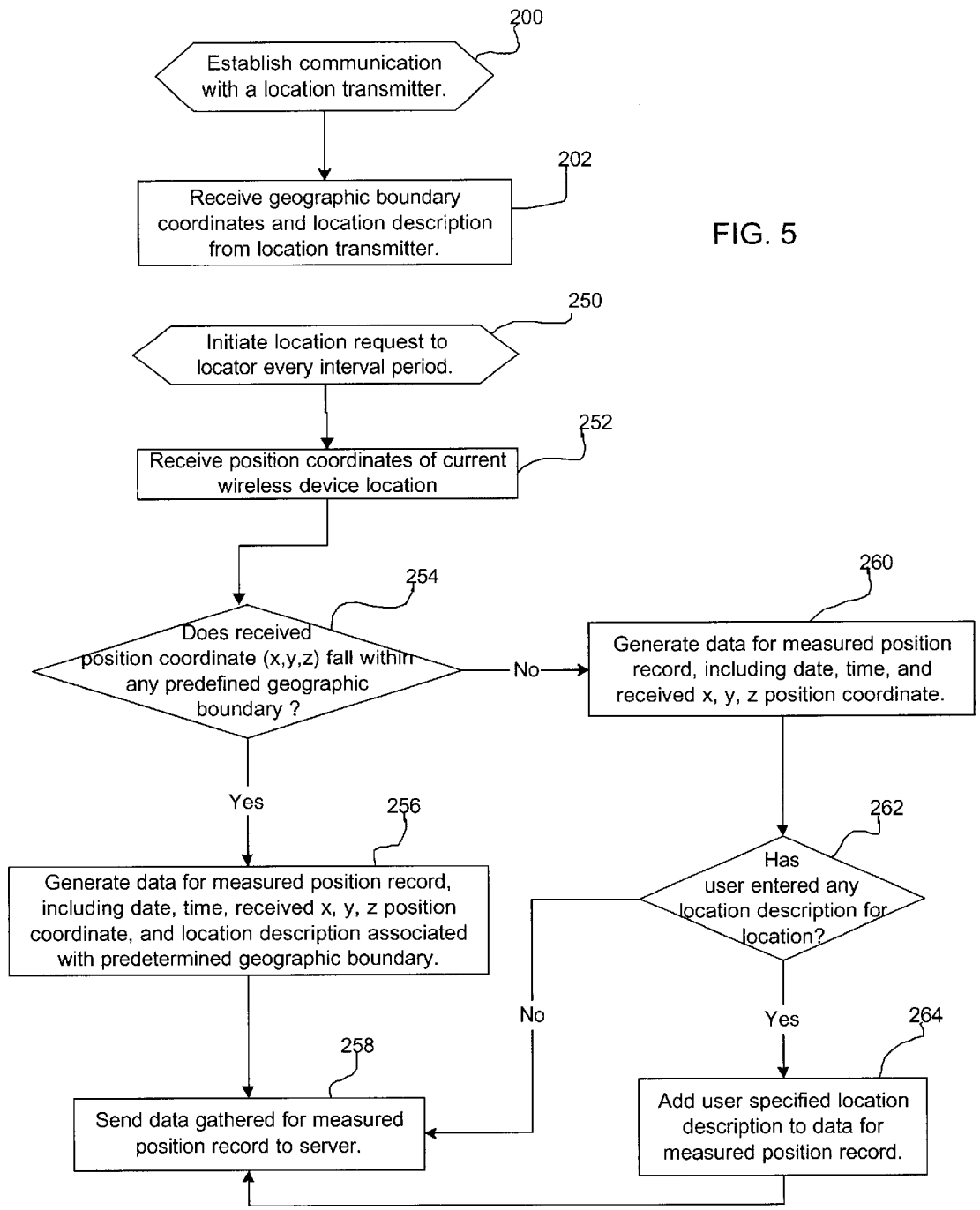
FIGS. 5, 6, and 7 illustrate flowcharts of code logic to gather, process, and use location information in accordance with implementations of the present invention.
Figure 6:
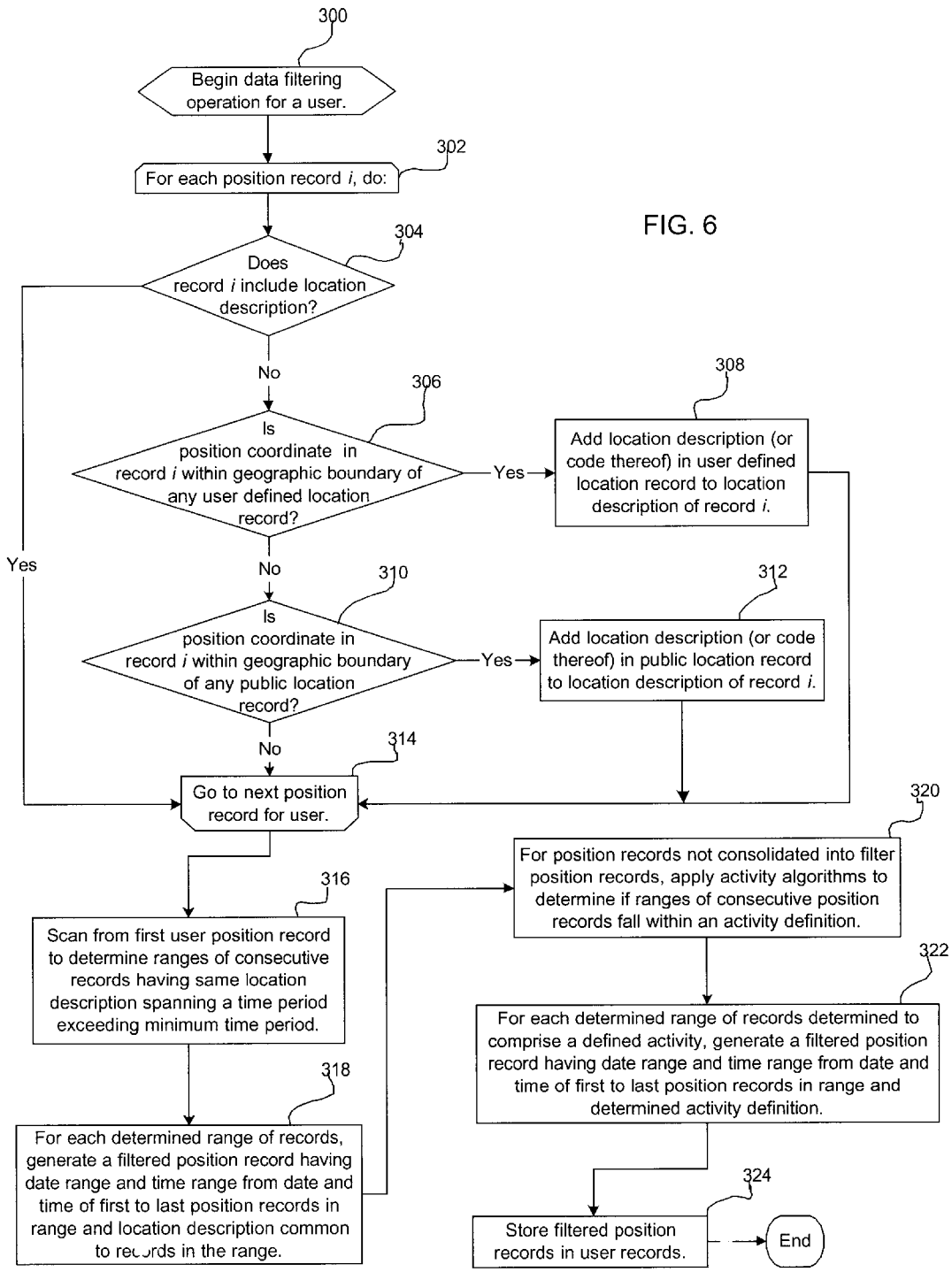
Figure 7:
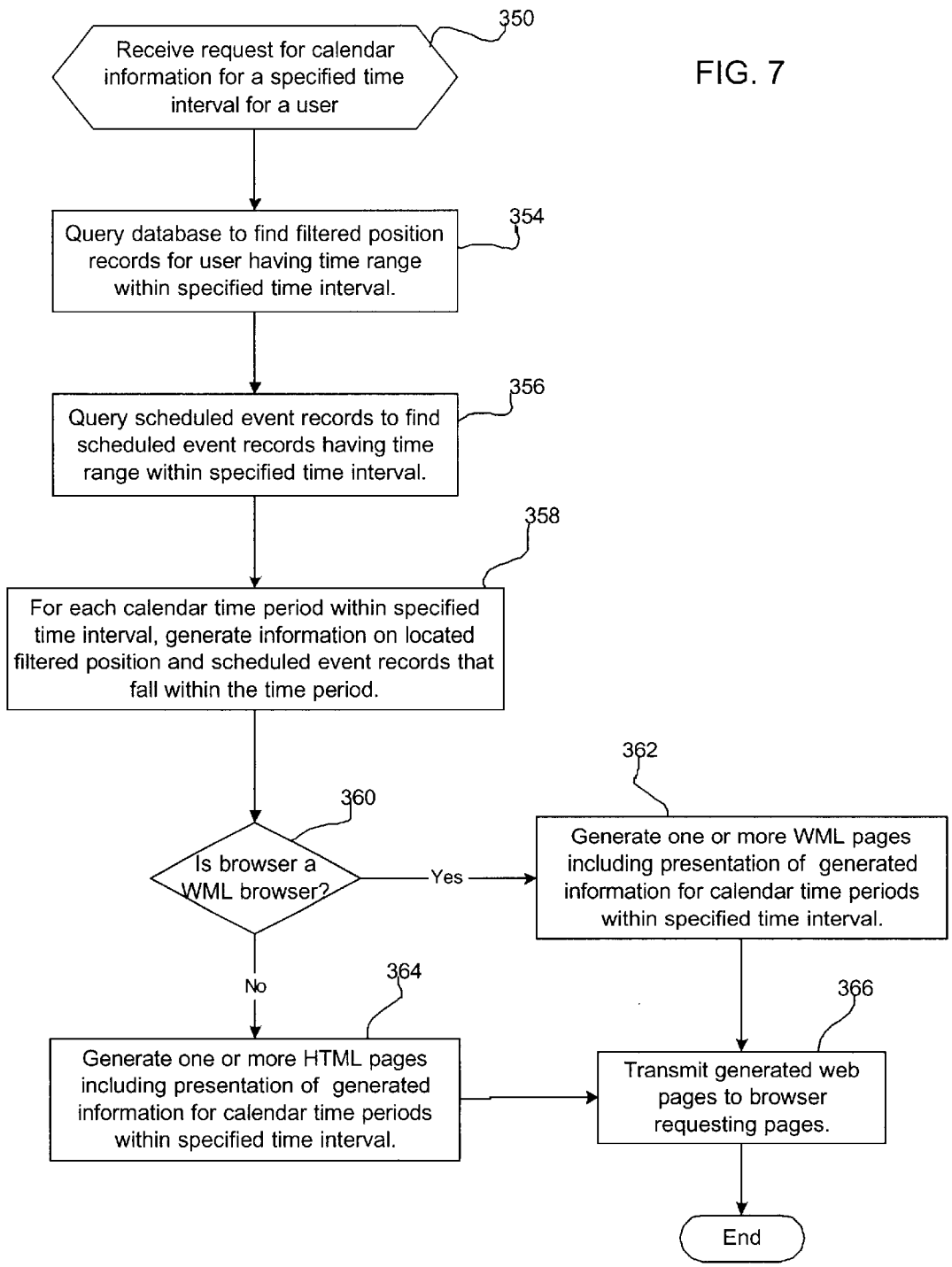

FIGS. 5–7 illustrate logic implemented in the PIM client 20 and server 24 to gather and utilize position information concerning the wireless device 2. FIG. 5 illustrates logic implemented in the PIM client 20 to gather position information to provide to the PIM server 24 to include within measured position records 54 in the database 22. At block 200, the wireless device 2 establishes communication with a location transmitter 110, using the Bluetooth technology or other wireless technology known in the art. After establishing a connection with the location transmitter 110, the PIM client receives (at block 202) a geographic boundary 116 comprised of X, Y, Z coordinates defining a three dimensional boundary on earth and location information describing the geographic boundary 116.

To provide data to the PIM server 24, the PIM client 20 performs steps 250 through 264 in interval time periods, e.g., every few seconds, minute, etc., to measure the current location and generate measured position records 54. At block 250, the PIM client 20 initiates a location request to the locator 14 or other unit to determine the current position coordinate (x, y, z) of the wireless device 2. Upon receiving (at block 252) the position coordinate from the locator 14, the PIM client 20 determines (at block 254) whether the received position coordinate falls within any predefined geographic boundaries supplied by a location transmitter 110, the PIM server 24, a user defined location record 56, or any other geographical boundary maintained by the PIM client 20. If so, the PIM client 20 generates (at block 256) data for a measured position record 54, including the received position coordinate, the date and time the coordinate was determined, and any location description associated with the predefined geographic boundary including the received position coordinate. The gathered data is then sent (at block 258) to the PIM server 24 to include as a position record 54 in the user records 50.

If (at block 254) the received position coordinate did not fall within any predefined geographic boundary, then the PIM client 20 generates (at block 260) data for a measured position record 54 including the received X, Y, Z position coordinate and the date and time the coordinate was measured. If (at block 262) the user has entered through the input mechanism 16 any location description for the current location through the input mechanism 16, then the PIM client 20 adds (at block 264) the user specified location description to the data for the measured position record. From block 264 or the no branch of block 262, the PIM client 20 transmits the data for the measured position record 54 to the PIM server 24 to include in the user records 50.

FIG. 5 provides logic implemented in the PIM client 20 to gather the position records for each measured coordinate. FIG. 6 illustrates logic for a filtering algorithm that consolidates and interprets the measured position records 54 and generates filtered position records 60 that provide information on the user's whereabouts and activities for time periods. The filtering algorithms used to generate the filtered position records 60 may be implemented in either the PIM client 20 or PIM server 24. In the event that the PIM client 20 executes the filtering algorithm, then the PIM client 20 would transmit the filtered position records 60 to the PIM server 54 to store in the PIM database 22.

With respect to FIG. 6, control begins at block 300 with the invocation of the filtering algorithm for the user records 50 of a particular user. A loop is performed from blocks 302 to 314 for each measured position record i in the user records 50 that has not yet been subject to filtering to add location description information 86 to the measured position record 64 if such data was not provided by the PIM client 20. If (at block 304) the measured position record i does not include any location description 86 data, then a determination is made (at block 306) as to whether the position coordinate 84 data in record i is within the geographic boundary of any user defined location records 56 of the user being considered. If so, then the location description 94 for the user defined location record 90 is added (at block 308) to the location description 86 data for the measured position record 64. If (at block 306) a geographic boundary was not located in the user defined location records 56, then a determination is made (at block 310) whether the position coordinate 84 data in record i is within the geographic boundary of any public location records 58. If so, then the location description 94 for the public location record 58 is added (at block 312) to the location description 86 data for the measured position record 64. From the yes branch of block 304 (if there is already location information added by the PIM client 20) or from blocks 308 or 312, control proceeds to block 314 to consider all the measured position records 54 for the user. The related application entitled "Method, System, and Program for Providing User Location Information for a Personal Information Management System", having attorney docket no. AUS920010221US1, which is incorporated by reference in its entirety above, provides additional implementations for obtaining location description information from the user records for other entities and persons in the PIM database 22.

After the measured position records 64 are supplemented with location information from user defined 56 or public 58 location records, then control proceeds to blocks 316 to generate the filtered position records 60 that are particularly suited for use in a PIM or calendaring program. At block 316, the filter scans from the first user position record 54 to determine ranges of consecutive position records 54 having the same location description 86 spanning a time period exceeding a minimum time period. Thus, the filter is looking for position records indicating that the user was at a same location for a minimum time. The minimum time may be a time period of sufficient length that would be meaningful to display in a PIM interface, such as a calendar or schedule, e.g., 10 minutes, etc. For each determined range of records, a filtered position record 60 is generated (at block 318) having a date 100 and time 102 ranges from the date and time of the first to last position records in the determined range and having a location description 106 that is the common location description 86 found in the position records 54 in the determined range. In this way, a single filter position record 50 is generated that defines a location position that was maintained for a minimum time.

At block 320, activity algorithms may then be applied to those position records not consolidated into filtered position records 58 at block 316 and 318. An activity algorithm would analyze a series of consecutive measured position records and based on a rate of change in distance per unit of time, determine a predefined activity associated with the position records. For instance, a range of consecutive measured position records 54 whose position coordinate 84 (x, y, z) is rapidly changing may indicate that the user is traveling in an automobile or other transportation vehicle. Other rate of changes may indicate other activities, e.g., walking, running, bicycle riding, etc. For each determined range of measured position records 54 that define an activity, a filtered position record 60 is generated (at block 322) having a date 100 and time 102 ranges from the date 80 and time 82 of the first and last measured position records 54 in the range and an activity description field 106 set to the activity determined for the range. The geographic location field 104 may comprise a range of first and last locations for the activity, wherein the first location would comprise the location 84 data from the first measured position record 64 in the range for the activity and the last location would comprise the location data 84 from the last record 84 in the range. Thus, in certain described implementations, a filtered position record 60 indicates a time period during which a user was at a location, defined by a geographic boundary or a time period during which the user was engaged in an activity involving movement from one location to another.

The filtered position records 60 are then stored (at block 324) in the PIM database 22 for later use. The filtered position records 60 provide more useful descriptive information than the measured position records 54 because they indicate time periods spent at meaningful geographic locations or engagement in a particular activity.

FIG. 7 illustrates logic implemented in the PIM server 24 to generate calendar information that can be displayed at the wireless device 2 or some other computer in communication with the server 4, such as a desktop computer accessing the server 4 over the Internet. Control begins at block 350 with a request for PIM information for a time interval for a user. In response, the PIM server 24 queries the PIM database 22 for filtered position records 60 (at block 354) and scheduled event records 52 (at block 356) of the user within the specified time interval. The PIM server 24 then generates (at block 358) for each calendar time period, e.g., every half-hour, hour, etc., information on the scheduled event description 74 and the location/activity description 106 (FIG. 3a, d) in the located scheduled event 52 and filtered position 58 records, respectively, that fall within the calendar time periods that span the specified time interval.

If (at block 360) the viewer program requesting the calendar information for the time period is a WML browser on a small device, e.g., the wireless device 2, then the PIM server 24 generates (at block 362) one or more WML pages including a presentation of the information generated for each calendar time period in the user specified time interval including information on user scheduled events and actual location/activity. Otherwise, if the viewer or browser requesting the calendar information includes a larger display area, then the PIM server 24 generates (at block 364) one or more HTML pages including the presentation of the generated calendar information. From blocks 362 or 364, control transfers to block 366 to transmit the generated web pages to the browser requesting that page. Alternatively, the PIM server 24 may include the generated calendar information in an Extensible Markup Language (XML) or other file that is sent to the PIM client 20 to render on the local display. Thus, the calendar information presented to the user may include a description of user scheduled events as well as information on the geographical locations the user associated with the wireless device 2 visited during the specified time interval.

FIG. 8 illustrates an example of calendar information for the user specified time period presented in a calendar window 400 rendered on a computer display monitor. As shown, the calendar displays both user scheduled events 402 from the scheduled event records and actual location/activity 404 from the filtered position records for calendar times 406 during the specified time interval. In this way, the user may compare what was scheduled with what actually materialized. Moreover, in implementations where the PIM server 24 updates the user calender information in real time and generates real time filtered position records, the calendar 400 could display the user's current geographical location. This information could be useful for business associates and others interested in the user's location. Additionally, the actual location/activity 402 may be displayed in an abbreviated format. The user may use an input device to selectively display further details on the actual location/activity. For instance, the user may move a mouse input device over the displayed abbreviation of the actual location/activity or click the displayed abbreviation to cause the display of more detailed information on the actual location/activity in the calendar window 400.

Figure 9A:
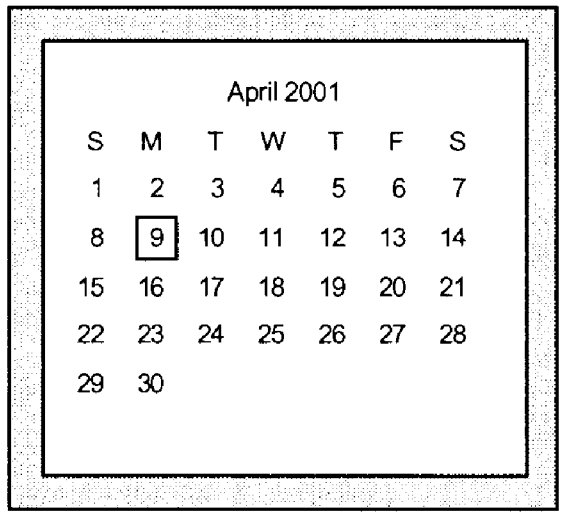
Figure 9B:
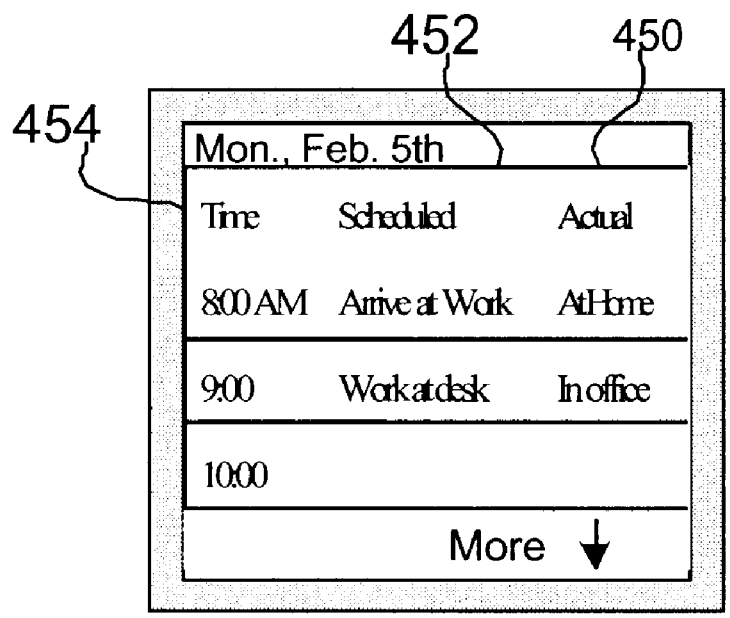

FIG. 9a, b illustrate how calendar information may be displayed on a display 18 of a wireless device 2 having limited display space. FIG. 9a illustrates a small displayed monthly calendar. Upon user selection through the input mechanism 18 of a particular day, e.g., February $5^{th}$, the PIM client 20 displays the view shown in FIG. 9b which provides information of scheduled events 450 and actual user location/activity 452 for a portion of the calendar times 454 during the user requested time interval. The user can use the input mechanism 18 to scroll downward to view fixer calendar entries.

The described implementations provide a technique for gathering and utilizing user position information for use with a PIM or calendaring program. This position information may be provided to the user and those authorized by the user to track actual activity versus scheduled activity.

Data Mining of the PIM Database

Figure 10:
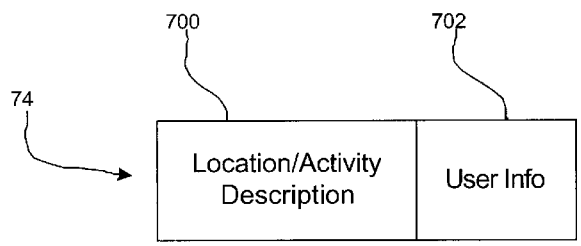
FIG. 10 illustrates data fields included in scheduled event records in accordance with certain implementations of the invention.

In certain of the described implementations, to allow for data mining, the scheduled event record 52 (FIG. 3a) would include information that would match the data in the location description/activity field 106 of the filtered position records 60 (FIG. 3d). FIG. 10 illustrates one implementation where the scheduled event description field 74 of the scheduled event record 52 (FIG. 3a) comprises two fields, a scheduled location/activity description 700 and user notes 704. The location/activity description 700 may comprise the same description 94 and 106 used with the location records 56, 58 (FIG. 3c) and filtered position records 60 (FIG. 3d), respectively. Thus, when using a graphical user interface (GUI) within the PIM client 20 to create scheduled event records 52, the user may select to indicate a location/activity description 700 with the scheduled event.

Figure 11:
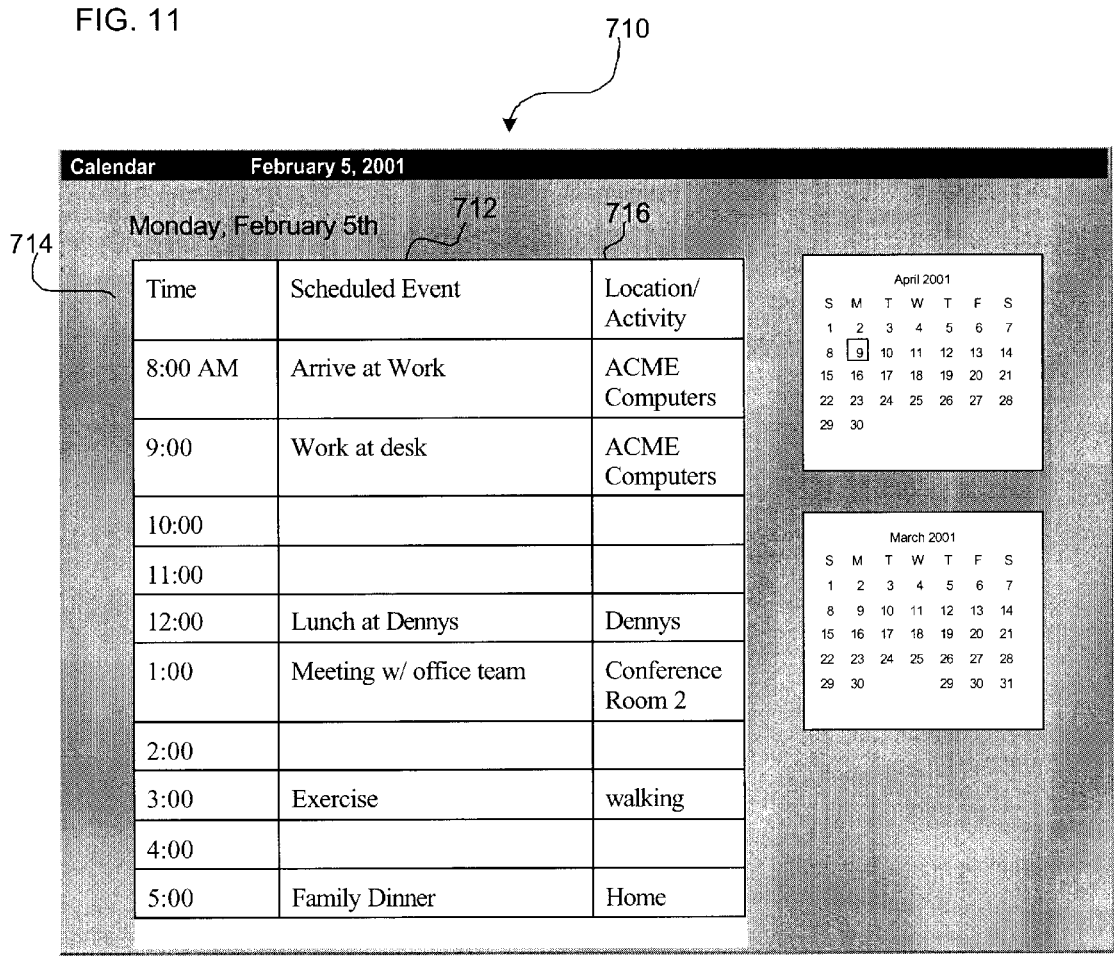
FIG. 11 illustrates a display of a user calendar of scheduled events in accordance with certain implementations of the invention.
Figure 12:
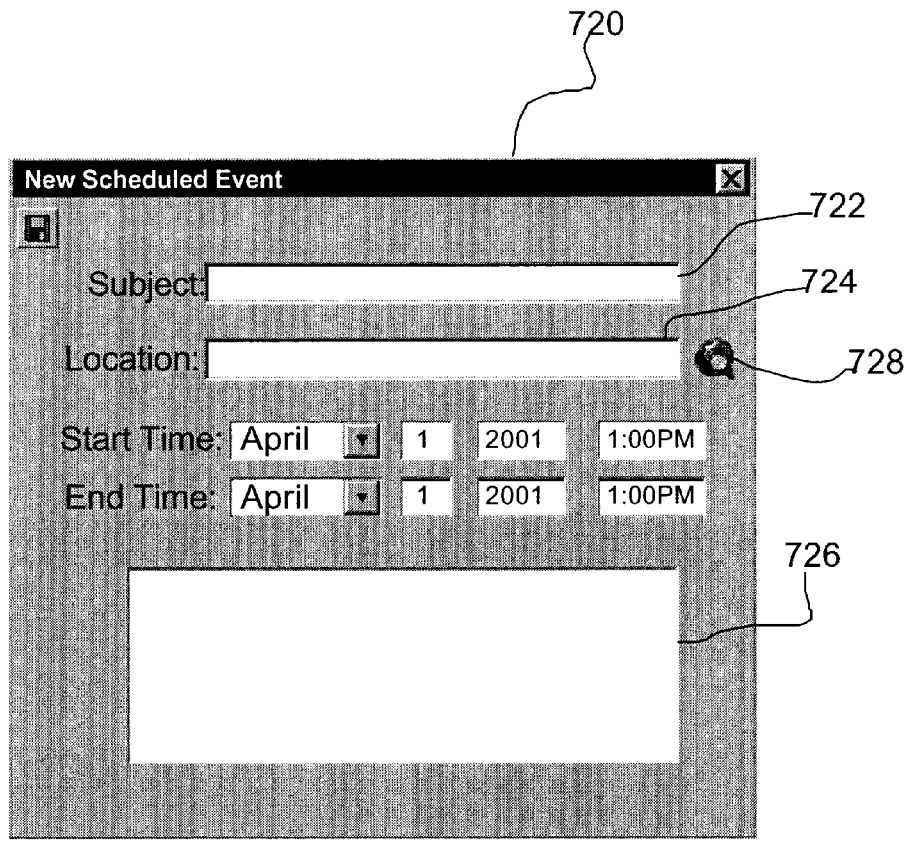
FIG. 12 illustrates user interface to enter scheduled events into a personal information management (IM) database in accordance with certain implementations of the invention.

FIG. 11 illustrates a calendar GUI 710 displaying a daily calendar view including scheduled events 712 for different time periods 714 that the user has entered and the location or activity description 716 associated with the scheduled event. FIG. 12 illustrates an add scheduled event GUI panel 720 in which the user creates a scheduled event entry and record 52 (FIG. 3a) displayed in the calendar GUI 710. The user may enter a description of the scheduled event in the subject field 722 and the location/activity description in the location/activity description field 724, which would be stored in the location/activity description field 700 of the scheduled event record. The user may also enter additional information in the text box 726 which would be stored within the user information field 702 of the scheduled event record. To enter a location/activity description that is also used with the measured 54 (FIG. 3b) and filtered position 60 (FIG. 3d) records in the PIM database 22, the user may select the search icon 728 to display the location/activity finder GUI panel 740 in which the user may search for location/activity descriptions 94 maintained in the user defined 56 and public 58 location records (FIG. 3c).

Figure 13:
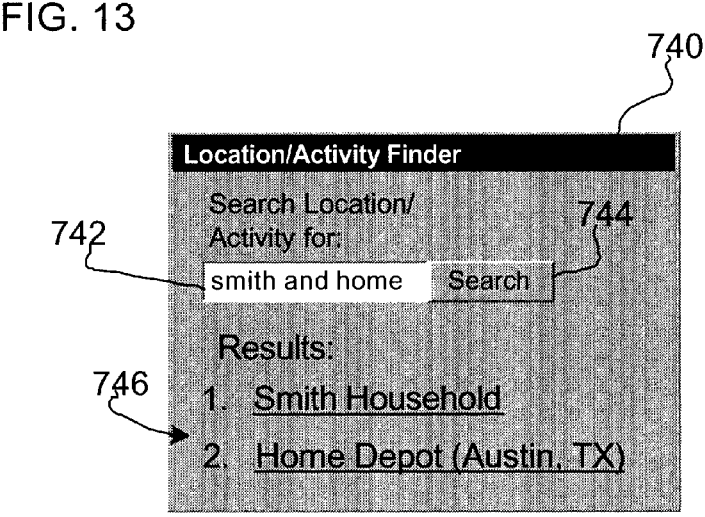
FIG. 13 illustrates a user interface to search and select a location/activity description for a scheduled event record in accordance with certain implementations of the invention.

In the finder GUI panel 740 of FIG. 13, the user may enter search terms in the search box 742 and select the search button 744 to cause the PIM server 24 to search the user defined 56 and public 58 location records (FIGS. 2, 3c) for records having location description 94 data matching the search terms. The PIM server 24 would then display the results 746 in the panel 740. The user may select one displayed result to enter into the location/activity description field 724 of the add scheduled event panel 720. In this way, the user entered scheduled events would utilize location/activity descriptions commensurate with those maintained in the database 22.

The described implementations provide a technique for data mining user records to allow the user to analyze the extent to which their scheduled events were actualized. Because the filtered position records 60 provide information on the time the user was engaged at a particular activity or present at a particular location, an analysis program within the PIM server 24 may analyze such information to determine the extent to which the user satisfied the parameters of the scheduled event.

Figure 14:
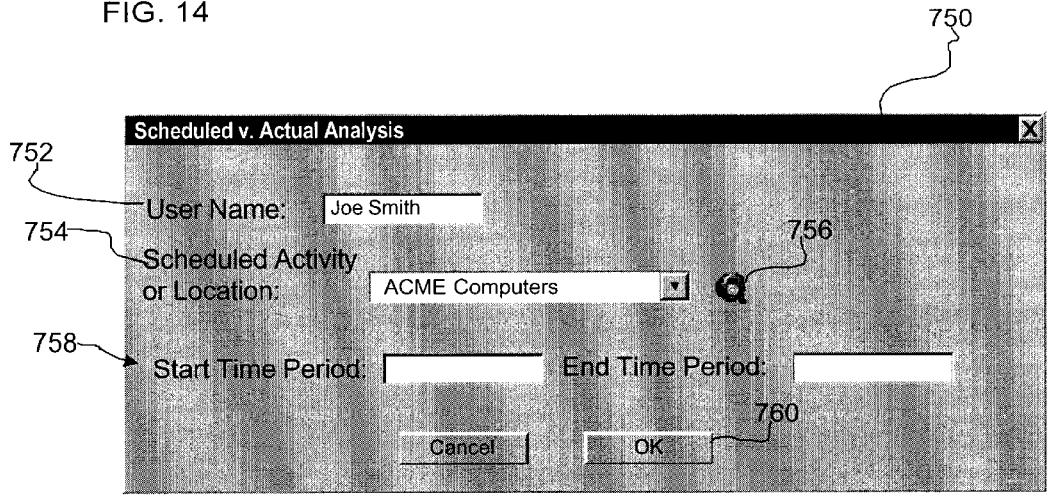
FIG. 14 illustrates a user interface to enter search criteria to query and analyze user records in the personal information manager (PIM) database in accordance with certain implementations of the invention.

FIG. 14 illustrates a GUI panel 750 in which the user would enter information to perform an analysis of the PIM database 22 based on user entered parameters. The user would enter the user name 752 of the user records 50 to search, and a scheduled location/activity description 754 on which to search. The user may select the location/activity search icon 756 to select a location/activity description used in the PIM database 22 as discussed above. The user may further select a time frame 758 in which to perform a search. In response, to entering all the above information and selecting the "OK" button 760, the PIM server 24 would then query the PIM database 22 and perform analysis on the data to generate a result panel 780 shown in FIG. 15.

Figure 15:
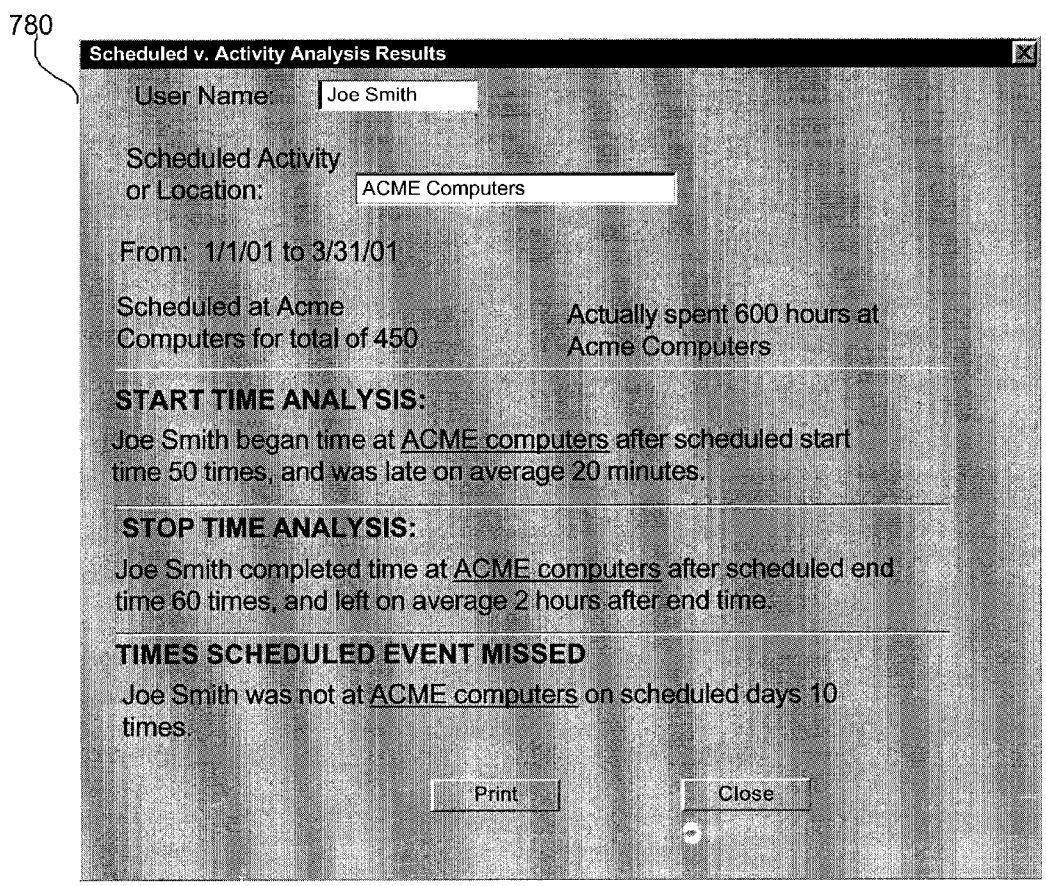
FIG. 15 illustrates a panel displaying results of the query and analysis based on the search criteria entered in the user interface shown in FIG. 14 in accordance with certain implementations of the invention.

The result panel 780 in FIG. 15 displays information determined from the user records 50 of the PIM database 22, such as the time scheduled at the location versus the time actually spent at the location, the time the user arrived after the scheduled start time, as well as the time the user remained at the location beyond the scheduled end time. Averages of time late and time spent beyond scheduled end time are also shown.

Figure 16:
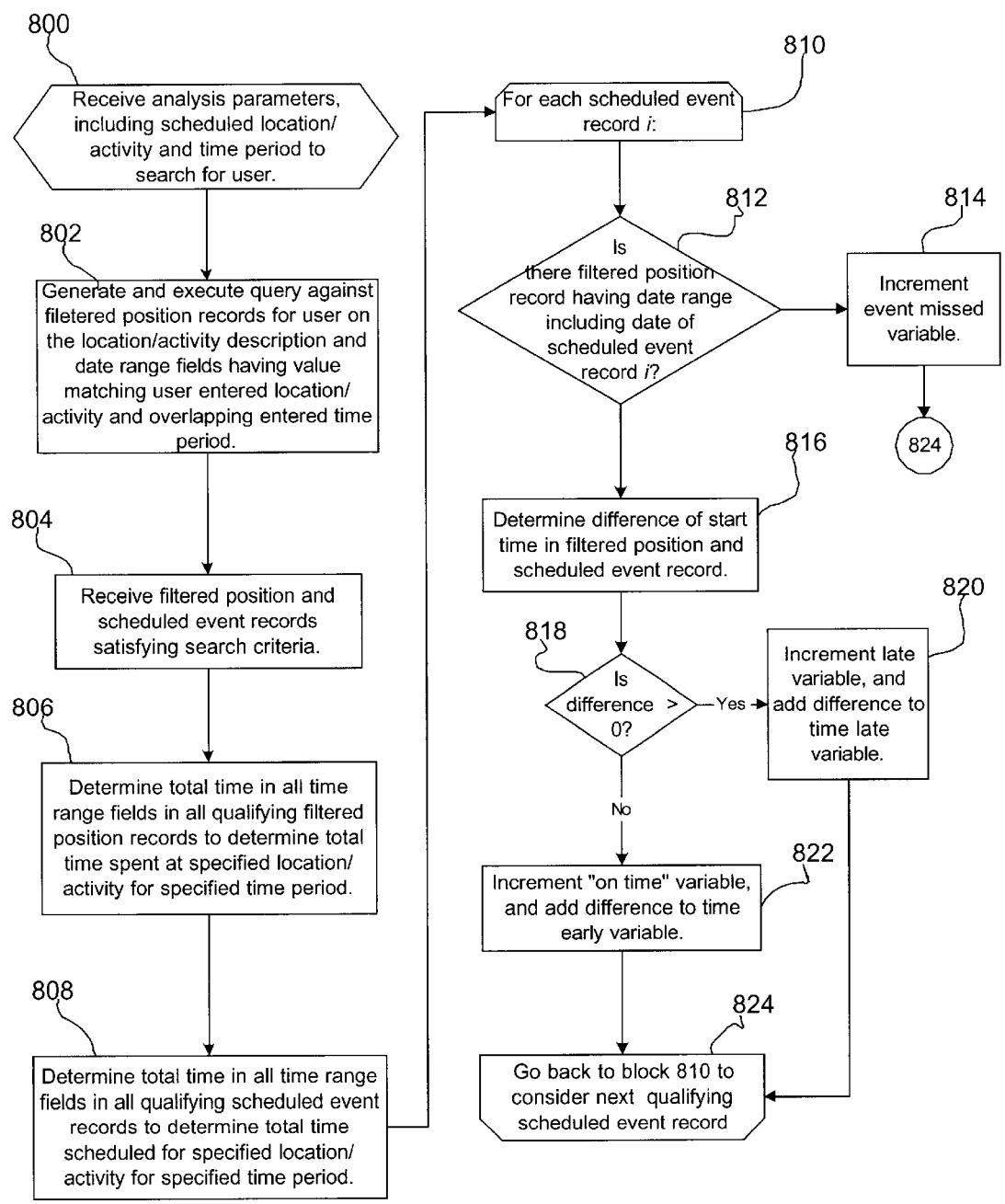
FIG. 16 illustrates logic to query and analyze records in the PIM database in accordance with certain implementations of the invention.

FIG. 16 illustrates logic implemented in an analysis program executed in the PIM server 24 to query and compute the information displayed in the result panel 780 (FIG. 14) in response to the user selecting the OK button 760 in the panel 750 (FIG. 13). Control begins at block 800 with the PIM server 24 receiving analysis parameters, including the user name, specified scheduled location/activity, and time period for the analysis, which may be entered into the GUI panel 750 (FIG. 14). In response, the analysis program generates and executes (at block 802) a query on the user filtered position records 60 that have a date range 100 and location activity description 106 (FIG. 3d) values that overlap the values the user entered in the fields 758 and 754, respectively, of the analysis entry panel 750 (FIG. 14). The query is also performed on scheduled event records 52 that have a date 70 (FIG. 3a) and location activity description 700 (FIG. 10) that overlap the values the user entered in fields 758 and 754 (FIG. 13), respectively. At block 804, the analysis program then receives filtered position and scheduled event records that satisfy the query.

From the received records, the analysis program can calculate (at block 806) the total time in all time range fields 102 in all the returned filtered position records 60 (FIG. 3d) to determine the total time actually spent at the specified location/activity for the specified time period. This data may then be displayed in the result panel 780 (FIG. 15) indicating how much time was actually spent at the scheduled event. Similarly, the analysis program determines (at block 808) the total time in the time period field 72 of all the qualifying scheduled event records 52 (FIG. 3a) to determine the total time scheduled for the specified location/activity. At blocks 810 through 824, the analysis routine executes a loop for each returned scheduled event record i to calculate further information concerning actual versus scheduled time for the specified location/activity. At block 812, the analysis routine determines whether there is a qualifying filtered position record 60 having a time range 102 (FIG. 3d) that overlaps the time period 72 (FIG. 3a) in scheduled event record i. If (at block 812) there is no such qualifying filtered position record 60 having an overlapping time period, then the analysis program increments (at block 814) the event missed variable, which is displayed in the "Times Scheduled Event Missed" field in the results panel 780 (FIG. 14). Otherwise, if there is a qualifying filtered position record 60 having an overlapping time period, then the analysis routine determines (at block 816) the difference of the start time of the time range field 102 of the determined filtered position record 60 (FIG. 3d) and the start time in the time period field 72 (FIG. 3a) of the scheduled event record i. If (at block 818) the difference is greater than zero, then the late variable is incremented (at block 820), indicating that the user was at the scheduled location/activity later than the scheduled time and the difference is added to the time late variable which accumulates the total amount of time the user was late. If the user arrived at the activity at or before the scheduled start time, then the "on time" variable is incremented (at block 822) and the difference is added to the time early variable, which accumulates the total amount of time the user was early. At block 824, the analysis routine returns to block 810 to perform the calculations for the next qualifying scheduled event record i The same data may be gathered for the end of the time period 72 in the qualifying scheduled event records 52 (FIG. 3a) to determine the number of times the user ended the scheduled location/activity on time or late, and the total amount of time by which the user ended their time at the scheduled location/activity early or late. From the gathered information, the user can calculate the average amount of time by which the user was later or early for the start and end of the scheduled location/activity.

The logic of FIG. 16 provides an implementation of a routine for generating information that may be of interest to the user. Further, an organization of which the user is a member, such as the user's employer may be interested in time spent at particular locations/activity versus the scheduled time. For instance, if the user was scheduled for meetings, or a particular type of meeting, for which there is a location/activity description 106, the employer may determine how often the user was late and the amount of time spent in such meetings.

Following are some additional applications of the analysis program to query and analyze user records for one or more users.

An entity may gather information on scheduled versus actual time spent at a location/activity for individual users or multiple users that are members of the entity. For instance, the entity can query the user filtered position records 60 F(G. 3d) to determine actual presence at a particular location, such as a conference room, dining facility, etc., to determine whether additional capacity needs to be added or to eliminate the facility.

An organization may query the user records for all employees to determine how many attend scheduled meetings and the amount of time at such spent at such meetings. Further, a company could query an employees user records 50 to determine the time spent in an office to determine whether the employee in fact needs permanent or temporary office space.

In a manufacturing facility, an employer may create scheduled event records that specify where each employee is to be situated on an assembly line. At some later point, the employer may then invoke the analysis program to determine the extent to which employees were situated at their scheduled location during manufacturing activity based on the filtered position records 60 that describe the actual location/activity of the user for time periods.

An individual may create scheduled event records 52 specifying a location description 700 (FIG. 10) for a gym or exercise facility or specifying an activity, such as walking or running. The individual user may then run the analysis program to determine the extent to actual scheduled exercise goals were completed, in terms of presence at a location or involvement in an activity. As discussed, the filtered position records 60 can indicate a user activity based on a rate of location and time change, indicating an activity such as walking, jogging, running, driving, flying in an airplane, etc.

In certain implementations, the analysis program may compare the time actually spent at a specified location or activity versus the scheduled amount of time for the specified location or activity for a time period without regard to whether the actual time at the location or activity occurred during the time period 72 (FIG. 3a) specified in the scheduled event record 52. In this way, the user may determine the absolute time they spent at the location or activity versus scheduled time for the time period, regardless of whether the user spent the time at the location or activity during scheduled time periods. Such analysis of scheduled versus actual time spent would be particularly useful for people attempting to determine whether they adhered to an exercise program, or performed an activity or spent time at a location according to the time scheduled for the activity or location.

Moreover, a doctor may prescribe that a person use the wireless device 2 to keep track of activity as part of a health regimen. Additionally, insurance companies could offer customers lower rates if they carry a wireless device 2 and generate user records 50 to allow the insurance company to determine whether the insured has been involved in a specified activity, such as running or walking, or visiting an exercise facility location for sufficient amounts of time during a specified time period.

An individual may track certain personal activities. For instance, a person may create a user defined location record 56 for the television watching area to determine the time spent watching television in comparison to a scheduled amount of time, or spent time at any other designated area. A person may also create a user defined location record 56 for their bed to compare and analyze scheduled sleep versus actual sleep, whether they went to bed too early or late or woke up too early or late.

In still further implementations, the location/activity description field 700 (FIG. 10) in the scheduled event record 52 may identify another user in the PIM database 22. In this way, the user may generate scheduled event records 52 specifying a time period during which the user intends to spend with another person. The analysis program could then query the PIM database 22 to determine all filtered position records of the user and the specified person indicated in the location/activity description field 70 that have geographic locations field 104 (FIG. 3d) values that are within a predetermined proximate distance or area, e.g., 15 feet, of the geographic locations 104 in the user filtered position records 60. The determined user filtered position records 52 could then be analyzed to determine the time spent with the specified user based on the aggregate of the time ranges 102 (FIG. 3d) within the user filtered position records 60 that have a geographic location 104 within the proximate area of the geographic location 104 of the specified user filtered position records 60. The analysis program can then determine how the time actually spent in proximity to the specified user compares to time scheduled with the other user as indicated in the scheduled event records.

A commercial or government entity may enlist wireless device 2 owners to provide their filtered position records 60 to allow determinations of the time the users spent at a particular location. For instance, a government agency can query the filtered position records of users to determine the time users spent at a public facility, such as a park, library, museum, etc. Further, a government agency can query filtered position records to determine time users spent on public roads as part of a traffic pattern study. Moreover, a third party may enlist people to carry wireless devices 2 to gather location information for marketing purposes, such as to determine streets or locations most frequented at particular hours. Such information would be very useful for marketing analysts when performing location analysis to determine where to locate retail establishments.

Figure 17:
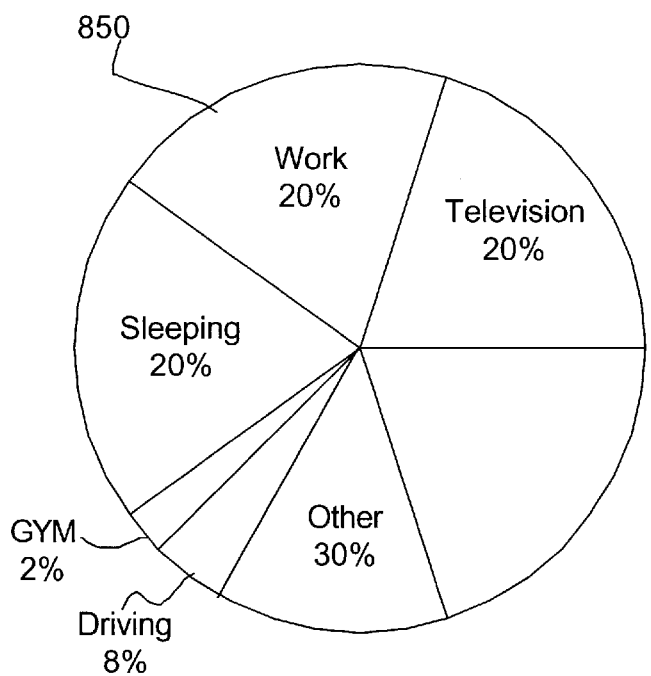
FIGS. 17 and 18 illustrate graphical presentations of the results of the query and analysis of the PIM database records for a user in accordance with certain implementations of the invention
Figure 18:
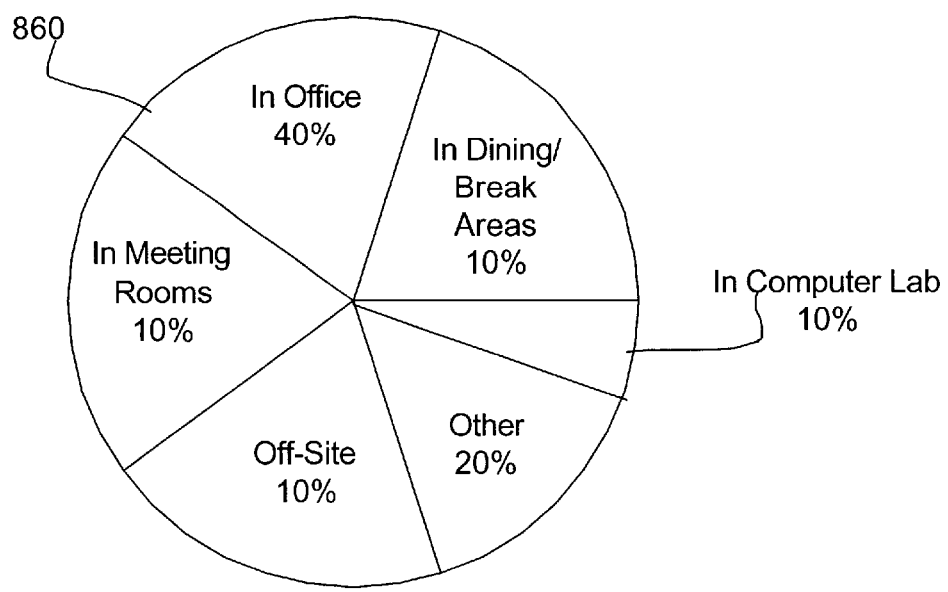

FIG. 15 illustrates a result panel 780 that provides textual information on the analysis of the user records 50. Additionally, the analysis program may provide graphs or pie charts showing the percentage of time spent at specified locations and/or activities. FIG. 17 illustrates a pie chart 850 breaking down time spent at different user defined or public locations. The analysis program could analyze the user filtered position records 60 to determine time the user spent at locations or activities indicated in the location description field 106 (FIG. 3d), calculate percentage of time spent for the specified time period at the locations/activities indicated in the filtered position specified record 60, and then generate the pie chart 850 shown in FIG. 116 for an individual. Similarly, FIG. 18 illustrates a pie chart 860 which provides a percentage breakdown from an employee's filtered position records 600 indicating time spent during work hours at specified locations identified in the location description fields 94 of public location records 58 for defined work areas within the work facility. Any time spent at locations outside of the facility are designated as off-site.

Those skilled in the art will appreciate that there are numerous additional type of user activity information that may be analyzed based on the filtered position 60 and/or scheduled event 52 records for one or more users. Further, there are numerous ways in which the information resulting from the user may be presented, stored, or displayed.

The described aspects of the invention, including the logic described with respect to the PIM client and server and any other devices, may be implemented as a method, apparatus or article of manufacture using standard programming and/ or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which the invention is implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the wireless device obtains the position coordinates and time and date information and transmits the data to the server 4. In alternative implementations, telecommunication devices or towers can detect the location of the wireless device and transmit the data for the measured position record 54 directly to the server 4. In such implementations, the wireless device would not be involved in transmitting position coordinates for the measured position records.

The described implementations concerned maintaining user location information with a user calendar program. The described implementations can further be used to provide and utilize a persons geographic location and/or activities for a measured time period for any purpose, not just calendering. For instance, a company may want to track the location and activity of workers. The company can then filter and compare a workers actual location/activity with their work schedule. Such information would be particularly useful for manufacturers and others attempting to determine optimal human resource allocation in the workplace.

The PIM location/activity information of the described implementations would also be very useful for companies that have to send workers out to field locations, such as cable companies, telephone companies, plumbers, etc., to track how the worker's actual location/activities correspond to those scheduled. In the case that real time worker location/ activity information is provided to the calendar display, then the company can track the workers schedule and their actual geographic location in real time. Moreover, because descriptive geographic information is provided, a quick review of the calendar information can provide useful information on the workers geographic location, such as their presence in a particular building. Moreover, to the extent location records define the geographic boundaries of major roadways and freeways, a manager could review a field workers real time calendar, which could display that the worker is presently driving on a roadway. The activity algorithm can specify the rate the worker is traveling, i.e., indicating stuck in traffic, etc.

In the described implementations, scheduled events and location/activity information were displayed together in a user calendar view. Alternatively, the calendar view may selectively display only scheduled events or location/ activity information.

The described implementations presented the scheduled event and location/activity information at different times during a user specified time interval. However, the generated location/activity information may be presented in alternative formats. For instance, the user may generate a display of all locations visited and activities, and the time period during which the location was visited or activity performed would be displayed under the location/activity display.

FIGS. 3a, b, c, d illustrate one implementation of the data structures used to maintain the information used in the described implementations. However, those skilled in the art will recognize that the there are numerous ways the data shown in FIGS. 3a, b, c, d may be organized in data structures and a database for storage and retrieval.

In the described implementations, the PIM server 24 transmitted the PIM information to the client PIM 20 or some other client to display in a browser, such as a WML or HTML browser. In alternative implementations, the PIM server 24 may provide the generated PIM information in alternative presentation and file formats, or alternative text markup languages than those described herein. Moreover, the location information presented to the user through the browser may present information in alternative presentation formats, such as audio, movies, etc. For instance, the calendar may display a hypertext description of the visited location. User selection of the hypertext description could present a movie or audio file about the visited location. Still further, the user, through the wireless device 2 or some other computer may provide images or audio files taken from a location to associate with measured position records. In certain implementations, the wireless device 2 could include a microphone, still image camera, video camera etc. The user could then associate such multi-media files image information with the location that the PIM client 20 would provide with the measured position records 54 sent to the PIM server 24. This information would be made available to those viewing the calendar providing the location/activity information.

In the described implementation, the generated location was expressed as an x, y, z position coordinate. However, as discussed, the position coordinate may be expressed as any set of numbers used in specifying a location in space, or may comprise a code or descriptor defining a location in space.

The foregoing description of the preferred embodiments of the invention has been presented for the purposes of illustration and description. It is not intended to be exhaustive or to limit the invention to the precise form disclosed Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for analyzing data within a personal information management program, comprising:

receiving from a wireless device measured records indicating time information and position coordinates;

processing the received measured records to determine measured records whose position coordinates are within a defined geographic boundary. wherein a database includes a plurality of the defined geographic boundaries each including a different set of position coordinates;

generating a position record in the database indicating a time period that spans the time periods indicated in the determined measured records and including event information indicating the defined geographic boundary that includes the position coordinates of the determined measured records;

determining an activity associated with a plurality of measured records having consecutive time periods that are not used to generate the position record whose event information indicates the defined geographic boundary;

generating a position record in the database indicating a time period that spans time periods in measured position records associated with the determined activity and including event information indicating the determined activity;

querying the database to determine position records for one user that satisfy at least one search criteria; and generating information characterizing data in the determined position records.

2. The method of claim 1, further comprising:

wherein the search criteria includes specified event information, wherein the query determines all position records having event information matching the specified event information; and for all the determined position records associated with event information matching the user specified event information, aggregating the time period values to determine a total time, wherein the generated information indicates the total time associated with the event identified by the specified event information.

3. The method of claim 2, further comprising:

displaying the total time associated with the event identified by the specified event information.

4. The method of claim 2, wherein the search criteria further specifies a time range, and wherein the determined position records have a time period value that falls within the specified time range, and wherein the generated information indicates the total time associated with the event identified in the specified event information for the specified time range.

5. The method of claim 2, wherein the search criteria includes multiple specified event information values, and wherein the generated information indicates the total time associated with each of the specified event information values.

6. The method of claim 2, wherein the search criteria includes one specified location, and wherein the total time indicates a time period the user of the wireless device was at the specified location.

7. The method of claim 6, wherein the query is performed with respect to multiple users in the database to determine position records for multiple users that satisfy the search criteria, and wherein the total time at the specified location is aggregated across the multiple users to determine the total time the multiple users were at the specified location.

8. The method of claim 1, wherein the search criteria includes one specified activity, and wherein the time value indicates the time period during which the user of the wireless device was engaged in the specified activity.

9. The method of claim 1, further comprising:

providing entered scheduled event records in the database for at least one user, wherein each scheduled event record includes a time period value and event information identifying a scheduled event at the time period value; and querying the database to determine all scheduled event records for the one user that satisfy the at least one search criteria that was used to query the position records for the user, wherein the generated information includes a comparison of the determined scheduled event records and the determined position records.

10. The method of claim 9, wherein the event information in the scheduled event records indicates a scheduled activity to perform during the associated time period value, wherein the search criteria comprises a specified activity, and wherein the generated information includes a comparison of the a scheduled time for the activity versus an actual time devoted to the activity.

11. The method of claim 10, wherein the user specified activity comprises a form of exercising.

12. The method of claim 9, wherein the event information in the scheduled event records identifies a location at which the user of the wireless device was present during the associated time period value, wherein the search criteria comprises a specified location, and wherein the generated information indicates a comparison of time scheduled to be at the location versus actual time at the specified location.

13. The method of claim 1, wherein each position record includes a position coordinate associated with the event, wherein the search criteria includes one specified user and a proximate area, wherein the position records of the specified user are queried to determine those position records having position coordinates that are within the proximate area of the position coordinates within the position records of the one user, and wherein the generated information characterizing the data indicates a time period the one user and the specified user were located within the same proximate area.

14. The method of claim 13, further comprising:
providing entered scheduled event records in the database for the one user, wherein each scheduled event record includes a time period value and event information identifying the specified user;
querying the database to determine all scheduled event records for the one user that include event information identifying the specified person; and
aggregating the time period value across all the determined scheduled event records to determine scheduled time to spend with the specified user, wherein the generated information includes a comparison of the determined scheduled time to spend with the specified user and the time period the one user and the specified user were located within the same proximate area.

15. A method for analyzing data within a personal information management program, comprising:
receiving from a wireless device measured records indicating time information and position coordinates;
processing the received measured records to determine measured records whose position coordinates are within a defined geographic boundary, wherein a database includes a plurality of the defined geographic boundaries each including a different set of position coordinates;
generating a position record in the database indicating a time period that spans the time periods indicated in the determined measured records and including location information indicating the defined geographic boundary that includes the position coordinates of the determined measured records;
determining an activity associated with a plurality of measured records having consecutive time periods that are not used to generate the position record;
generating a position record in the database indicating a time period that spans time periods in measured position records associated with the determined activity;
querying the database to determine position records for one user that satisfy at least one search criteria including specified event information;
querying the database to determine scheduled event records for one user that satisfy at least one search criteria including specified event information, wherein each scheduled event record for one user includes a time period value and event information of a scheduled event for the user;
determining an aggregate amount of actual user time from the time periods included in the determined position records for the event identified by the specified event information;
determining an aggregate amount of scheduled time from the time periods included in the determined scheduled event records for the event identified by the specified event information; and
displaying information indicating the aggregate amount of scheduled time and the aggregate amount of actual user time for the event identified by the user specified event information.

16. The method of claim 15, wherein the displayed information provides a comparison of the scheduled and actual time devoted for the event identified by the specified event information.

17. The method of claim 15, wherein each time period value in the scheduled event and the position records indicates a start and end time for the event identified by the event information;
for each determined scheduled event record, performing:
(i) determining the determined position records that have start and end times that overlap with the start and end times of the scheduled event record; and
(ii) determining the position records having the start time that differs from the start time in the scheduled event record, wherein the generated information indicates an extent to which an actual start time is different from a scheduled start time.

18. The method of claim 17, wherein for each determined scheduled event record, further performing:
determining the position records having the end time that is different than the end time in the scheduled event record, wherein the generated information indicates an extent to which an actual end time is different from a scheduled end time.

19. A system for analyzing data within a personal information management program in communication with a wireless device, comprising:
a database;
means for receiving from the wireless device measured records indicating time information and position coordinates;
means for processing the received measured records to determine measured records whose position coordinates are within a defined geographic boundary, wherein the database includes a plurality of defined geographic boundaries each including a different sets of position coordinates;
means for generating a position record in the database indicating a time period that spans the time periods indicated in the determined measured records and including event information indicating the defined geographic boundary that includes the position coordinates of the determined measured records;

means for determining an activity associated with a plurality of measured records having consecutive time periods that are not used to generate the position record whose event information indicates the defined geographic boundary;

means for generating a position record in the database indicating a time period that spans time periods in measured position records associated with the determined activity and including event information indicating the determined activity;

means for querying the database to determine position records for one user that satisfy at least one search criteria; and means for generating information characterizing data in the determined position records.

20. The system of claim 19, wherein the search criteria includes specified event information, wherein the means for querying the database determines all position records having event information matching the specified event information, further comprising:

means for aggregating the time period values to determine a total time for all the determined position records that include event information matching the user specified event information, wherein the generated information indicates the total time associated with the event identified by the specified event information.

21. The system of claim 20, further comprising:

means for displaying the total time associated with the event identified by the specified event information.

22. The system of claim 20, wherein the search criteria further specifies a time range, and wherein the determined position records have a time period value that falls within the specified time range, and wherein the means for generating information indicates the total time associated with the event identified in the specified event information for the specified time range.

23. The system of claim 20, wherein the search criteria includes multiple specified event information values, and wherein the means for generating information indicates the total time associated with each of the specified event information values.

24. The system of claim 20, wherein the search criteria includes one specified location, and wherein the total time indicates a time period the user of the wireless device was at the specified location.

25. The system of claim 24, wherein the query is performed with respect to multiple users in the database to determine position records for multiple users that satisfy the search criteria, and wherein the total time at the specified location is aggregated across the multiple users to determine the total time the multiple users were at the specified location.

26. The system of claim 19, wherein the search criteria includes one specified activity, and wherein the time value indicates the time period during which the user of the wireless device was engaged in the specified activity.

27. The system of claim 19, further comprising:

means for providing entered scheduled event records in the database for at least one user, wherein each scheduled event record includes a time period value and event information identifying a scheduled event at the time period value; and means for querying the database to determine all scheduled event records for the one user that satisfy the at least one search criteria that was used to query the position records for the user, wherein the generated information includes a comparison of the determined scheduled event records and the determined position records.

28. The system of claim 27, wherein the event information in the scheduled event records indicates a scheduled activity to perform during the associated time period value, wherein the search criteria comprises a specified activity, and wherein the generated information includes a comparison of the a scheduled time for the activity versus an actual time devoted to the activity.

29. The system of claim 28, wherein the user specified activity comprises a form of exercising.

30. The system of claim 27, wherein the event information in the scheduled event records identifies a location at which the user of the wireless device was present during the associated time period value, wherein the search criteria comprises a specified location, and wherein the generated information indicates a comparison of time scheduled to be at the location versus actual time at the location.

31. The system of claim 19, wherein each position record includes a position coordinate associated with the event, wherein the search criteria includes one specified user and a proximate area, wherein the position records of the specified user are queried to determine those position records having position coordinates that are within the proximate area of the position coordinates within the position records of the one user, and wherein the generated information characterizing the data indicates a time period the one user and the specified user were located within the same proximate area.

32. The system of claim 31, further comprising:

means for providing entered scheduled event records in the database for the one user, wherein each scheduled event record includes a time period value and event information identifying the specified user;

means for querying the database to determine all scheduled event records for the one user that include event information identifying the specified person; and means for aggregating the time period value across all the determined scheduled event records to determine scheduled time to spend with the specified user, wherein the generated information includes a comparison of the determined scheduled time to spend with the specified user and the time period the one user and the specified user were located within the same proximate area.

33. A system for analyzing data within a personal information management program receiving information from a wireless device, comprising:

a database;

means for receiving from the wireless device measured records indicating time information and position coordinates;

means for processing the received measured records to determine measured records whose position coordinates are within a defined geographic boundary, wherein the database includes a plurality of defined geographic boundaries each including a different set of position coordinates;

means for generating a position record in the database indicating a time period that spans the time periods indicated in the determined measured records and including event information indicating the defined geographic boundary that includes the position coordinates of the determined measured records;

means for determining an activity associated with a plurality of measured records having consecutive time periods that are not used to generate the position record whose event information indicates the defined geographic boundary;

means for generating a position record in the database indicating a time period that spans time periods in measured position records associated with the determined activity and including event information indicating the determined activity;

means for querying the database to determine position records for one user that satisfy at least one search criteria including specified event information;

means for determining an aggregate amount of actual user time from the time periods included in the determined position records for the event identified by the specified event information;

querying the database to determine scheduled event records for one user that satisfy at least one search criteria including specified event information, wherein each scheduled event record for one user includes a time period value and event information of a scheduled event for the user;

means for determining an aggregate amount of scheduled time from the time periods included in the determined scheduled event records for the event identified by the specified event information; and means for displaying information indicating the aggregate amount of scheduled time and the aggregate amount of actual user time for the event identified by the user specified event information.

34. The system of claim 33, wherein the displayed information provides a comparison of the scheduled and actual time devoted for the event identified by the specified event information.

35. The system of claim 33, wherein each time period value in the scheduled event and the position records indicates a start and end time for the event identified by the event information, further comprising:

means for performing, for each determined scheduled event record:
(i) determining the determined position records that have start and end times that overlap with the start and end times of the scheduled event record; and
(ii) determining the position records having the start time that differs from the start time in the scheduled event record, wherein the generated information indicates an extent to which an actual start time is different from a scheduled start time.

36. The system of claim 35, wherein for each determined scheduled event record, further comprising:

means for determining the position records having the end time that is different than the end time in the scheduled event record, wherein the generated information indicates an extent to which an actual end time is different from a scheduled end time.

37. An article of manufacture including code for analyzing data within a personal information management program in communication with a wireless device and a database, by:

receiving from the wireless device measured records indicating time information and position coordinates;

processing the received measured records to determine measured records whose position coordinates are within a defined geographic boundary, wherein the database includes a plurality of defined geographic boundaries each including a different set of position coordinates;

generating a position record in the database indicating a time period that spans the time periods indicated in the determined measured records and including event information indicating the defined geographic boundary that includes the position coordinates of the determined measured records;

determining an activity associated with a plurality of measured records having consecutive time periods that are not used to generate the position record;

generating a position record in the database indicating a time period that spans time periods in measured position records associated with the determined activity and including event information indicating the determined activity;

querying the database to determine position records for one user that satisfy at least one search criteria; and generating information characterizing data in the determined position records.

38. The article of manufacture of claim 37, further comprising:

wherein the search criteria includes specified event information, wherein the query determines all position records having event information matching the specified event information; and for all the determined position records that include event information matching the user specified event information, aggregating the time period values to determine a total time, wherein the generated information indicates the total time associated with the event identified by the specified event information.

39. The article of manufacture of claim 38, further comprising:

displaying the total time associated with the event identified by the specified event information.

40. The article of manufacture of claim 38, wherein the search criteria further specifies a time range, and wherein the determined position records have a time period value that falls within the specified time range, and wherein the generated information indicates the total time associated with the event identified in the specified event information for the specified time range.

41. The article of manufacture of claim 38, wherein the search criteria includes multiple specified event information values, and wherein the generated information indicates the total time associated with each of the specified event information values.

42. The article of manufacture of claim 38, wherein the search criteria includes one specified location, and wherein the total time indicates a time period the user of the wireless device was at the specified location.

43. The article of manufacture of claim 42, wherein the query is performed with respect to multiple users in the database to determine position records for multiple users that satisfy the search criteria, and wherein the total time at the specified location is aggregated across the multiple users to determine the total time the multiple users were at the specified location.

44. The article of manufacture of claim 37, wherein the search criteria includes one specified activity, and wherein the time value indicates the time period during which the user of the wireless device was engaged in the identified activity.

45. The article of manufacture of claim 37, further comprising:

providing entered scheduled event records in the database for at least one user, wherein each scheduled event record includes a time period value and event information identifying a scheduled event at the time period value; and querying the database to determine all scheduled event records for the one user that satisfy the at least one search criteria that was used to query the position records for the user, wherein the generated information includes a comparison of the determined scheduled event records and the determined position records.

46. The article of manufacture of claim 45, wherein the event information in the scheduled event records indicates a scheduled activity to perform during the associated time period value, wherein the search criteria comprises a specified activity, and wherein the generated information includes a comparison of the a scheduled time for the activity versus an actual time devoted to the activity.

47. The article of manufacture of claim 46, wherein the user specified activity comprises a form of exercising.

48. The article of manufacture of claim 45, wherein the event information in the scheduled event records identifies a location at which the user of the wireless device was present during the associated time period value, wherein the search criteria comprises a specified location, and wherein the generated information indicates a comparison of time scheduled to be at the location versus actual time at the location.

49. The article of manufacture of claim 37, wherein each position record includes a position coordinate associated with the event, wherein the search criteria includes one specified user and a proximate area, wherein the position records of the specified user are queried to determine those position records having position coordinates that are within the proximate area of the position coordinates within the position records of the one user, and wherein the generated information characterizing the data indicates a time period the one user and the specified user were located within the same proximate area.

50. The article of manufacture of claim 49, further comprising:

providing entered scheduled event records in the database for the one user, wherein each scheduled event record includes a time period value and event information identifying the specified user;

querying the database to determine all scheduled event records for the one user that include event information identifying the specified person; and aggregating the time period value across all the determined scheduled event records to determine scheduled time to spend with the specified user, wherein the generated information includes a comparison of the determined scheduled time to spend with the specified user and the time period the one user and the specified user were located within the same proximate area.

51. An article of manufacture including code for analyzing data within a personal information management program in communication with a wireless device and a database, by:

receiving from the wireless device measured records indicating time information and position coordinates;

processing the received measured records to determine measured records whose position coordinates are within a defined geographic boundary, wherein the database a includes a plurality of defined geographic boundaries each including a different set of position coordinates;

generating a position record in the database indicating a time period that spans the time periods indicated in the determined measured records and including event information indicating the defined geographic boundary that includes the position coordinates of the determined measured records;

determining an activity associated with a plurality of measured records having consecutive time periods that are not used to generate the position record;

generating a position record in the database indicating a time period that spans time periods in measured position records associated with the determined activity and including event information indicating the determined activity;

querying the database to determine position records for one user that satisfy at least one search criteria including specified event information;

determining an aggregate amount of actual user time from the time periods included in the determined position records for the event identified by the specified event information;

querying the database to determine scheduled event records for one user that satisfy at least one search criteria including specified event information, wherein each scheduled event record for one user includes a time period value and event information of a scheduled event for the user;

determining an aggregate amount of scheduled time from the time periods included in the determined scheduled event records for the event identified by the specified event information; and displaying information indicating the aggregate amount of scheduled time and the aggregate amount of actual user time for the event identified by the user specified event information.

52. The article of manufacture of claim 51, wherein the displayed information provides a comparison of the scheduled and actual time devoted for the event identified by the specified event information.

53. The article of manufacture of claim 51, wherein each time period value in the scheduled event and the position records indicates a start and end time for the event identified by the event information;

for each determined scheduled event record, performing:
(i) determining the determined position records that have start and end times that overlap with the start and end times of the scheduled event record; and
(ii) determining the position records having the start time that differs from the start time in the scheduled event record, wherein the generated information indicates an extent to which an actual start time is different from a scheduled start time.

54. The article of manufacture of claim 53, wherein for each determined scheduled event record, further performing:

determining the position records having the end time that is different than the end time in the scheduled event record, wherein the generated information indicates an extent to which an actual end time is different from a scheduled end time.

* * * * *

UNITED STATES PATENT AND TRADEMARK OFFICE
CERTIFICATE OF CORRECTION

| | | |
|---|---|---|
| PATENT NO. | : 6,751,626 B2 | Page 1 of 1 |
| APPLICATION NO. | : 09/848176 | |
| DATED | : June 15, 2004 | |
| INVENTOR(S) | : Michael Wayne Brown, Rabindranath Dutta and Michael A. Paolini | |

It is certified that error appears in the above-identified patent and that said Letters Patent is hereby corrected as shown below:

<u>Column 17</u>
Line 25, after "location.", begin new paragraph with "Still".
Line 64, delete "boundary." and insert -- boundary -- .

<u>Column 19</u>
Line 22, delete "at the location" and insert -- at the specified location -- .

Signed and Sealed this

Twenty-sixth Day of June, 2007

JON W. DUDAS
*Director of the United States Patent and Trademark Office*